(12) United States Patent  (10) Patent No.: US 8,978,094 B2
Kiehtreiber et al.  (45) Date of Patent: Mar. 10, 2015

(54) CENTRALIZED OPERATION MANAGEMENT

(71) Applicant: Apple Inc., Cupertino, CA (US)

(72) Inventors: Peter Kiehtreiber, Campbell, CA (US); Jacques A. Vidrine, San Francisco, CA (US); Christopher S. Linn, Palo Alto, CA (US); Randy D. Saldinger, San Jose, CA (US); Braden J. Thomas, San Jose, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 13/624,828

(22) Filed: Sep. 21, 2012

(65) Prior Publication Data

US 2013/0205362 A1 Aug. 8, 2013

Related U.S. Application Data

(60) Provisional application No. 61/595,021, filed on Feb. 3, 2012.

(51) Int. Cl.
H04L 29/06 (2006.01)
(52) U.S. Cl.
CPC ...................................... H04L 63/20 (2013.01)
USPC ............................................................ 726/1
(58) Field of Classification Search
CPC ...................................................... H04L 63/20
USPC ............................................................ 726/1
See application file for complete search history.

(56) References Cited

U.S. PATENT DOCUMENTS

| 4,799,635 | A | 1/1989 | Nakagawa |
| 5,917,912 | A | 6/1999 | Ginter et al. |
| 7,185,192 | B1 | 2/2007 | Kahn |
| 7,657,925 | B2 | 2/2010 | Pesati et al. |
| 7,698,744 | B2 * | 4/2010 | Fanton et al. ............... 726/27 |
| 7,805,752 | B2 | 9/2010 | Newstadt et al. |
| 8,079,086 | B1 | 12/2011 | Edery et al. |
| 8,375,458 | B2 * | 2/2013 | Kiehtreiber ................ 726/30 |
| 2007/0195358 | A1 | 8/2007 | Imai |
| 2008/0127292 | A1 | 5/2008 | Cooper et al. |
| 2008/0168553 | A1 | 7/2008 | Kiehtreiber |
| 2009/0319480 | A1 | 12/2009 | Saito |
| 2010/0043052 | A1 | 2/2010 | Park et al. |

(Continued)

FOREIGN PATENT DOCUMENTS

| WO | WO 2009/111408 | 9/2009 |
| WO | PCT/US2012/072191 | 12/2012 |
| WO | WO 2013/115927 | 8/2013 |

OTHER PUBLICATIONS

International Search Report and Written Opinion for PCT/US2012/072191, Mar. 27, 2013 (mailing date), Apple Inc.

(Continued)

Primary Examiner — Jacob Lipman
(74) Attorney, Agent, or Firm — Adeli LLP

(57) ABSTRACT

A novel security framework that is part of an operating system of a device is provided. The framework includes a security assessor that performs security policy assessments for different operations that need to be performed with respect to an application executing on the device. Examples of such operations include the installation of the application, execution of the application, and the opening of content files (e.g., opening of documents) by the application.

26 Claims, 25 Drawing Sheets

(56) References Cited

U.S. PATENT DOCUMENTS

| | | |
|---|---|---|
| 2010/0095349 A1 | 4/2010 | Motoyama |
| 2010/0229242 A1 | 9/2010 | Iga |
| 2011/0007348 A1 | 1/2011 | Yamaizumi |
| 2011/0307960 A1 | 12/2011 | Cepuran et al. |
| 2013/0205363 A1 | 8/2013 | Kiehtreiber et al. |
| 2013/0205364 A1 | 8/2013 | Kiehtreiber et al. |

OTHER PUBLICATIONS

Updated portions of prosecution history of U.S. Appl. No. 13/624,832, Sep. 30, 2014, Kiehtreiber, Peter, et al.

Portions of prosecution history of U.S. Appl. No. 13/624,836, Sep. 30, 2014, Kiehtreiber, Peter, et al.

International Preliminary Report on Patentability for PCT/US2012/072191, Aug. 14, 2014 (mailing date), Apple Inc.

Portions of prosecution history of U.S. Appl. No. 13/624,832, Apr. 14, 2014, Kiehtreiber, Peter, et al.

Updated portions of prosecution history of U.S. Appl. No. 13/624,832, Nov. 4, 2014, Kiehtreiber, Peter, et al.

Updated portions of prosecution history of U.S. Appl. No. 13/624,836, Nov. 3, 2014, Kiehtreiber, Peter, et al.

* cited by examiner

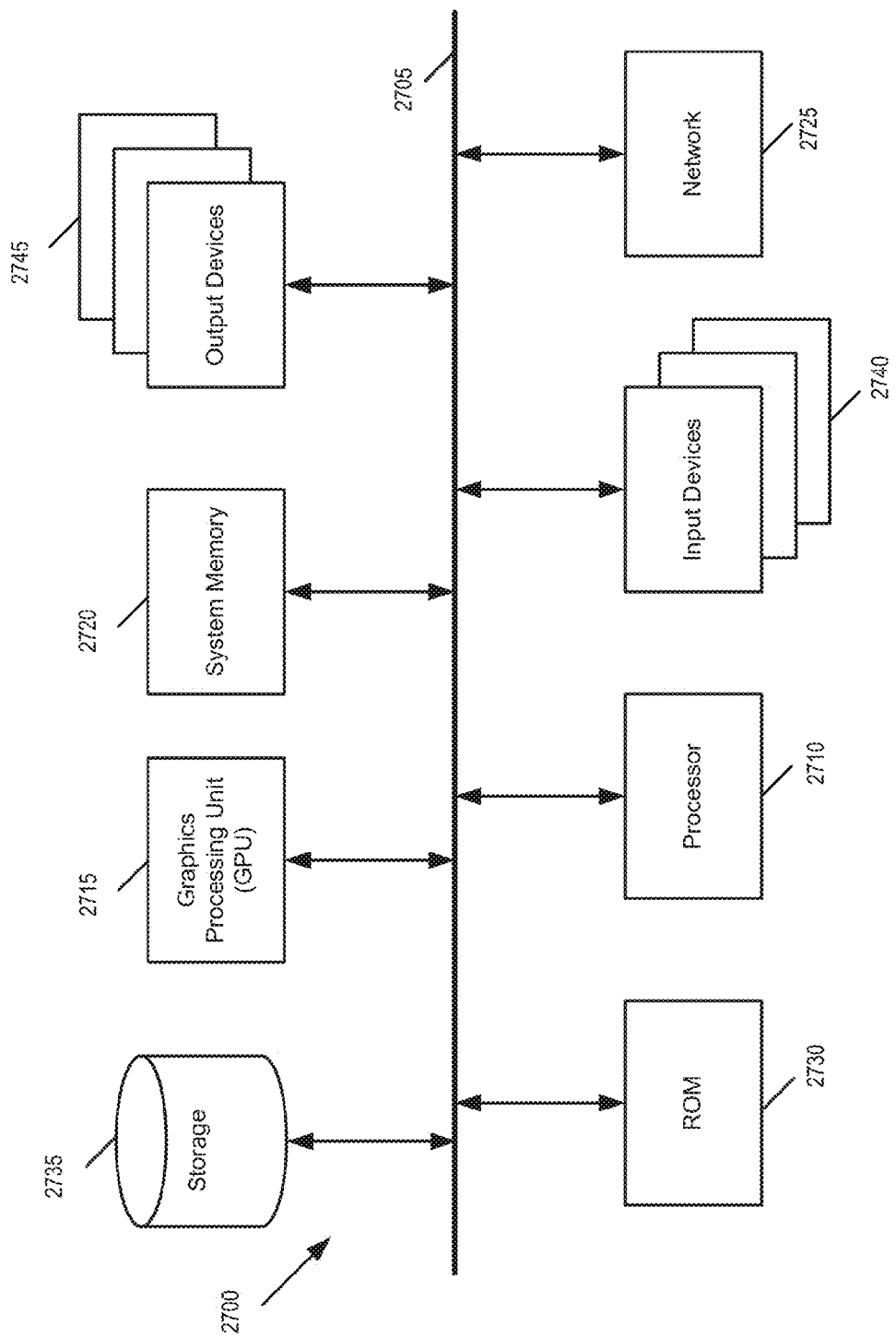

CENTRALIZED OPERATION MANAGEMENT

CLAIM OF BENEFIT TO PRIOR APPLICATIONS

This present application claims the benefit of U.S. Provisional Patent Application 61/595,021 filed Feb. 3, 2012. U.S. Provisional Patent Application 61/595,021, is incorporated herein by reference.

BACKGROUND

The identity and authenticity of programs stored and running on a computer system is a fundamental security issue for users. Essentially, users want the programs with which they interact to perform as the programs are advertised. Users may encounter problems when they trust a specific program, while the program behaves in an unexpected way. In some situations, the program may have been deliberately altered, or a virus or other security issue may be present. More often than not, the program simply behaves differently than the user initially expected because it does not come from a trusted source, it has been altered at some point rendering it incompatible with other components, or it is ineffective for some other reasons.

Running on modern computers are thus a slew of security programs attempting to address this problem. Each of these applications addresses a set of security needs of the computer. They include anti-virus applications, firewalls, malware detection programs, signature checking mechanisms, etc. Some of these programs are offered as part of the operating system, some are integrated into Internet browsers, while others are purchased or even downloaded from third-party vendors.

However, these programs are not consistent mechanisms for establishing authentication of identities. They cannot be relied upon to comprehensively check all operations running in the operating system, even though any operation running in the system may introduce data objects that come from untrustworthy sources and damage the computer. These processes often fail to perform optimally in the operating system and slow down the overall system speed. The hodge-podge nature of these security programs makes it difficult or impossible to introduce a set of uniform security interface programming for software developers. Worse yet, some of these hodge-podge assortments of security assessment programs may have come from sources that have yet to be properly certified as trustworthy.

What is needed is consistent mechanism for establishing authentication of identities. Specifically, what is needed is a security assessment mechanism that is fully integrated with the operating system to offer consistent performance, comprehensive examination of operations taking place in the operating system, and uniform software development support.

SUMMARY

Some embodiments of the invention provide a novel security framework for a device. In some embodiments, this framework is part of the operating system of the device. The framework of some embodiments includes a security assessor that performs security policy assessments for different operations that need to be performed with respect to an application executing on the device. Examples of such operations include the installation and execution of the application, and the opening of content files (e.g., opening of documents) by the application.

In some embodiments, the device has an operation initiator that receives requests for different operations with respect to the application. Upon receiving such a request, the operation initiator directs the security assessor to check the viability of the requested operation based on security policy rules that are stored in a security policy data storage. Security policy rules in some embodiments are used to check on the validity of the downloaded programs, to verify the source or publisher of the program, etc. If a security policy rule allows the requested operation, the security assessor informs the operation initiator that the operation has been approved, and the operation initiator directs the appropriate operation handler (e.g., installer, executor, or file opener) to perform the requested operation.

In some embodiments, the security policies are embodied in different rules or instructions that are stored in a rules database. The rules in the rules database specify what is required of data objects (e.g., program code or documents to open) in order for them to comply with the computer's security policy. In some embodiments, the rules database includes different tables in order to make queries on the rules database more efficient. An authority table and a cache table are two examples of such tables.

Assessing the security of a data object under a security policy, in some embodiments, requires examining the authority table's entries in the rules database in the order set forth by their priorities. For any given security assessment for a data object in these embodiments, lower priority rules become applicable only when higher priority rules are not applicable. A higher priority rule supersedes lower priority rules where they overlap. Hence any change to a higher priority rule potentially changes the applicability of lower priority rules.

The operation initiator in some embodiments performs the security assessment for each operation that is requested for the application. In other embodiments, the operation initiator performs the security assessment only for some of the operations that are requested for the application. For instance, in some embodiments, the assessment is performed only for the installation of a newly received application or only for the initial opening of a newly received file by the application. To facilitate this approach, the device of some embodiments associates a tag with newly received applications and newly received files when such files are first loaded onto the device or opened for the first time (e.g., first downloaded through a network or through a peripheral interface of the device).

The security assessor of some embodiments, approve or disapprove the validity of one or more data files by verifying the validity of a data structure (such as an "archive") containing the data files. In such some embodiments, the archives carry signature of identity which can be used to securely authenticate the data files and identify the source of the data files included in those archives. More specifically, the operating system of these embodiments includes rules in the rules database that approve or disapprove documents or data files based on the signature embedded in the archive structures containing those documents or data files. A document in an approved archive is automatically approved.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 27 conceptually illustrates an electronic system with which some embodiments of the invention are implemented.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Operating System with Security Assessment

Figure 1:
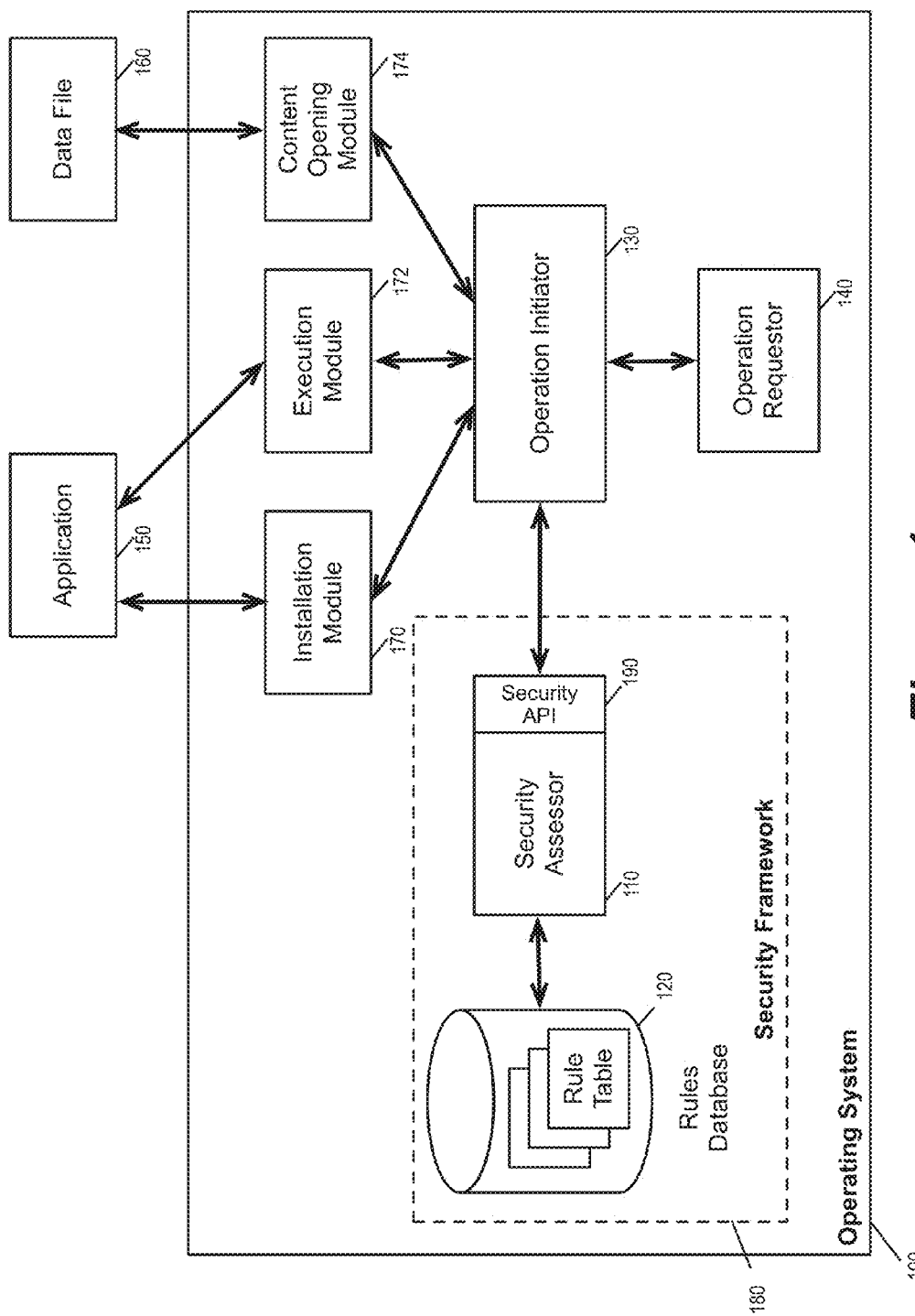
FIG. 1 illustrates an operating system of a computing device that assesses the security of different operations that it is requested to perform.

FIG. 1 illustrates an operating system 100 of a computing device that assesses the security of different operations that it is requested to perform. The requested operations can be executing applications, installing applications, opening documents, etc. The security of the requested operation is assessed by a security assessor, which is part of a security framework provided by the operating system. Based on this security assessment, the operating system either terminates the requested operation or allows it to proceed.

As illustrated in FIG. 1, the operating system 100 includes the security assessor 110, a rules database 120, an operation initiator 130, an operation requestor 140, an installation module 170, an execution module 172, and a content opening module 174. FIG. 1 also illustrates an application 150 and a data file 160 for which the operating system 100 assesses the security policy. The security assessor 110 and the rules database 120 are part of a security framework 180 that provides application programming interface (API) 190.

The operating system 100 is a set of programs that manages computer hardware resources and provides common services for different software application programs. The operating system 100 acts as an intermediary between application programs and computer hardware for functions such as input, output, and memory allocation. In some embodiments, the application code of a program is executed by the hardware and interacts with the operating system through interrupts received from the operating system or calls made to the operating system.

The application 150 is an executable data object for operating and performing functions on the operating system. Examples of application 150 include word processors, web browsers, games, media editing applications, etc. In some embodiments, the application 150 is an installation program that installs one or more executable programs on the computer the operating system 100 is running.

In some embodiments, the application 150 embeds one or more signatures of identity to allow a user of the application to determine the authenticity of the application. A signature that is embedded in the application 150 is a secured identifier of the source or the publisher of the application. A data object (e.g., an application) is "signed" when a signature is generated based on the content of the data object by using a secret private key that is known only to the signer of the data object. Such a signature is therefore capable of identifying the signer or the source of the data object and protecting the integrity of the data object. To authenticate the signature of a data object, i.e., to verify that the signature is indeed generated off the data object by its purported source/signer, the recipient of the data object (i.e., the operating system) uses a public key to authenticate the signature along with the content of the data object. The public key is known to have come from the purported source/signer, and the recipient can independently verify that the public key is indeed issued by the purported source/signer (e.g., by querying a trusted certificate authority or by checking the recipient's own database.)

In some embodiments, a signature of a data object is extracted from a public key certificate that is associated with the data object. A public key certificate (also known as a digital certificate or identity certificate) is an electronic document which uses a digital signature to bind a public key with an identity—information such as the name of a person or an organization, their address, and so forth. The certificate can be used to verify that a public key belongs to an individual. The signatures on a certificate are attestations by the certificate signer that the identity information and the public key belong together. A signature that is generated or signed based on both the content of the application data object and the information in the certificate, when authenticated, attests that the content of the application data object has not been tempered with, and that the information in the certificate is genuine. In addition to the signature and the source identifiers (e.g., the vendor ID and the public key), the certificate also includes information on how the signature can be authenticated (e.g., the ID of the algorithm that is used to generate the signature).

In the example of FIG. 1, the operating system 100 performs the signature authentication operation. In some embodiments, the operating system 100 prevents the application 150 from executing or installing if the operating system fails to authenticate the application's signature. In some embodiments, the operating system 100 prevents the operations of even an authenticated application to proceed unless the application is from an origin that has been determined to be trustworthy according to a set of security policies.

Figure 25:
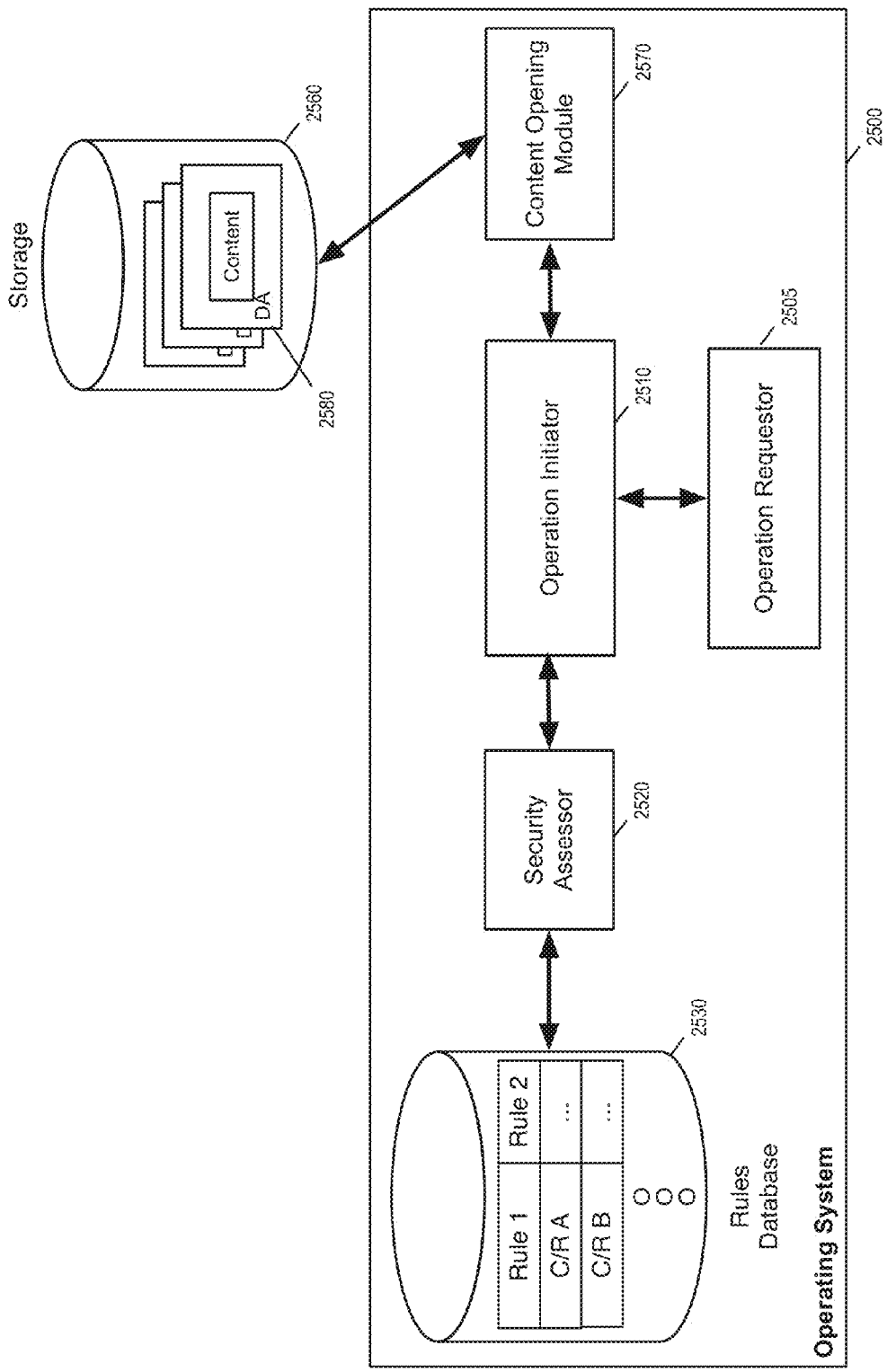
FIG. 25 illustrates an operating system that includes rules in the rules database for making security assessments of data files or documents based on the signatures in data archives.
Figure 26:
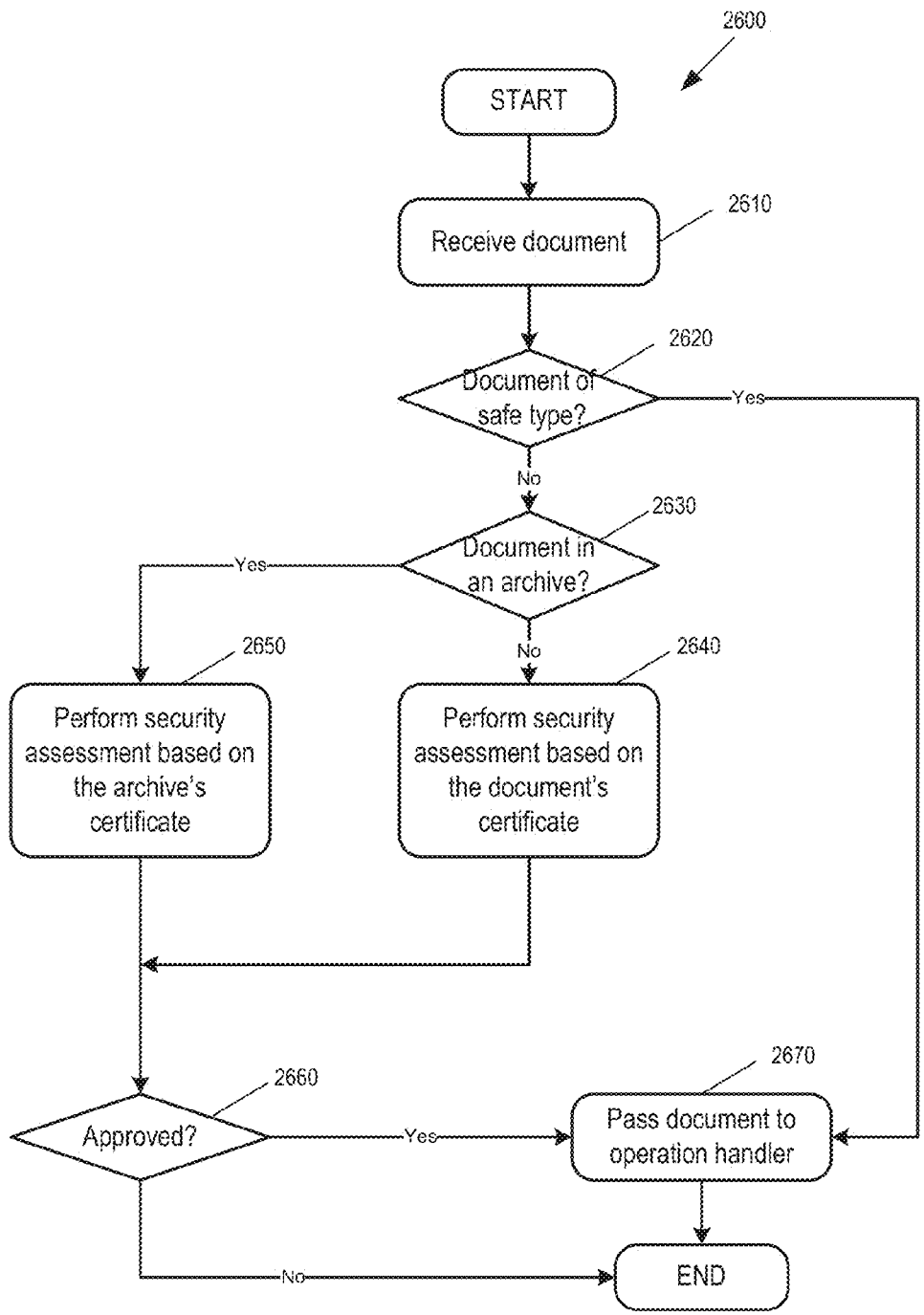
FIG. 26 conceptually illustrates a process that performs security assessments of document opening operations.

The data file 160 is a data object associated with one or more applications that can execute in the operating system. Examples of data file 160 include text files, word processor documents, spreadsheets, media files, etc. The data file 160 is read or opened by an application capable of reading or opening the data file. In some embodiments, the data file 160 includes documents that do not include signatures or certificates. The data file can also be placed in an archive structure so that the data file can be associated with signatures or certificates. FIGS. 25 and 26 below describe how the security assessor of some embodiments handles data files in data archives.

The installation module 170 is a module within the operating system 100 that oversees the installation of applications, such as application 150. In some embodiments, the installation module 170 waits for a "proceed" command from the operation initiator 130 before it starts processing the application 150 for installation through the operating system. In some of these embodiments, the installation module passes the application data object 150 to the security assessor 110 for verifying the application's signature as well as its compliance with a set of requirements according to a set of security policies. The installation module 170 proceeds to install the application 150 only when it receives a communication from the operation initiator 130 indicating that the application 150 is authenticated and its source is verified.

The execution module 172 is a module within the operating system 100 that launches applications, such as the application 150, for execution in the operating system 100. Like the installation module 170, the execution module 172 in some embodiments waits for a "proceed" command from the operation initiator 130 before it launches the application 150 for execution through the operating system 100. In some of these embodiments, the execution module passes the application data object 150 to the security assessor 110 for verifying the application's signature and for satisfying a set of requirements according to a set of security policies. The execution module 172 proceeds to execute the application 150 only when it receives a launch command from the operation initiator 130 after the application 150 has been authenticated and its source verified.

The content opening module 174 is a module within the operating system 100 that oversees the opening of data file 160. In some embodiments, opening content involves an operation that identifies a suitable application for the content in the data file 160 and then delivers the content to the application. As mentioned above, the content of the data file may or may not be accompanied by a signature and may or may not need to be authenticated. For documents that need to be authenticated, the document is passed to the security assessor 110 in order to verify the document's signature and to satisfy a set of requirements according to a set of security policies. The content opening module 174 proceeds to open the document data file 160 only when it receives a launch command from the operation initiator 130 after data file 160 has been authenticated and its source verified.

In some embodiments, the opening of the data file 160 is associated with the execution of an application. The content opening module 174 in some of these embodiments first identifies the application for opening the data file 160. If the application identified by the content opening module 174 is already executing in the operating system, the content opening module delivers the data file to the execution module 172 to be executed. If the identified application is not currently being executed, the content opening module 174 causes the execution module 172 to start executing the application. The execution of the identified application takes place only after the operating system 100 has determined that the application is authenticated and its source is verified.

The operation requestor 140 is a module that requests the performance of a particular operation by the operating system 100. Such operations can include installing an application, executing an application, opening data files, etc. In some embodiments, the operation requestor 140 is a user interface (such as a GUI) that receives a user command for opening a document or executing a particular application (e.g., by selecting a graphical icon for a document or an application). The operation requestor 140 can also be a different program executing within the operating system and making a request to the operation initiator 130 for the operation to be performed. In some embodiments, the operation requestor 140 also receives notification from the operation initiator 130 if the security policy of the operating system 100 would not allow the operation to take place (e.g., the signature of the application 150 fails to be authenticated, or if the source of the application 150 is not trusted.)

The operation initiator 130 is a module that enforces the security policy of the operating system by allowing or preventing a particular operation to take place. The operation initiator 130 receives a request for the particular operation from the operation requestor 140. Based on the request, the operation initiator 130 obtains the necessary data objects (e.g., the application 150 or the data file 160). The operation initiator 130 then requests the security assessor 110 to assess the requested operation under the security policies of the operating system 100. The operation initiator also passes the received data object to the security assessor as part of the requested security assessment operations.

The security assessor 110 is a module that determines whether an operation complies with the security policies of the operating system. The security assessor 110 receives a query from the operation initiator 130 requesting assessment of the security policy concerning a particular operation. The security assessor 110 determines whether the operation complies with the security policies by examining data objects associated with the operation. For instance, request based on an operation to install the application 150 may include several data objects for the security assessor to examine (e.g., installation files of an installation package for the application 150 as well as the installation program itself). In another example, a request for opening the data file 160 by application 150 may include data objects for both the executable program of application 150 and the data file 160 to be examined by the security assessor 110. In some embodiments, the application 150 and the data file 160 are referred to as the subject of the security assessment. The security assessor 110 then responds to the query received from the operation initiator 130. For example, if the particular operation satisfies the requirements of the security policy, the security assessor informs the operation initiator 130 that the security policy is satisfied. On the other hand, if the particular operation fails to satisfy the requirements of the security policy, the security assessor responds to the operation initiator that the particular operation has failed the security policy.

In some embodiments, the security assessor 110 and the rules database 120 are implemented as part of the security framework 180 that performs security assessment for the operating system 100. Other components of the operating system can use the security API 190 provided by the security framework 180 to perform security assessment of the operations. In the example of FIG. 1, the operation initiator 130 is a component of the operating system 100 that communicates with the security assessor 110 through the API 190.

Figure 2:
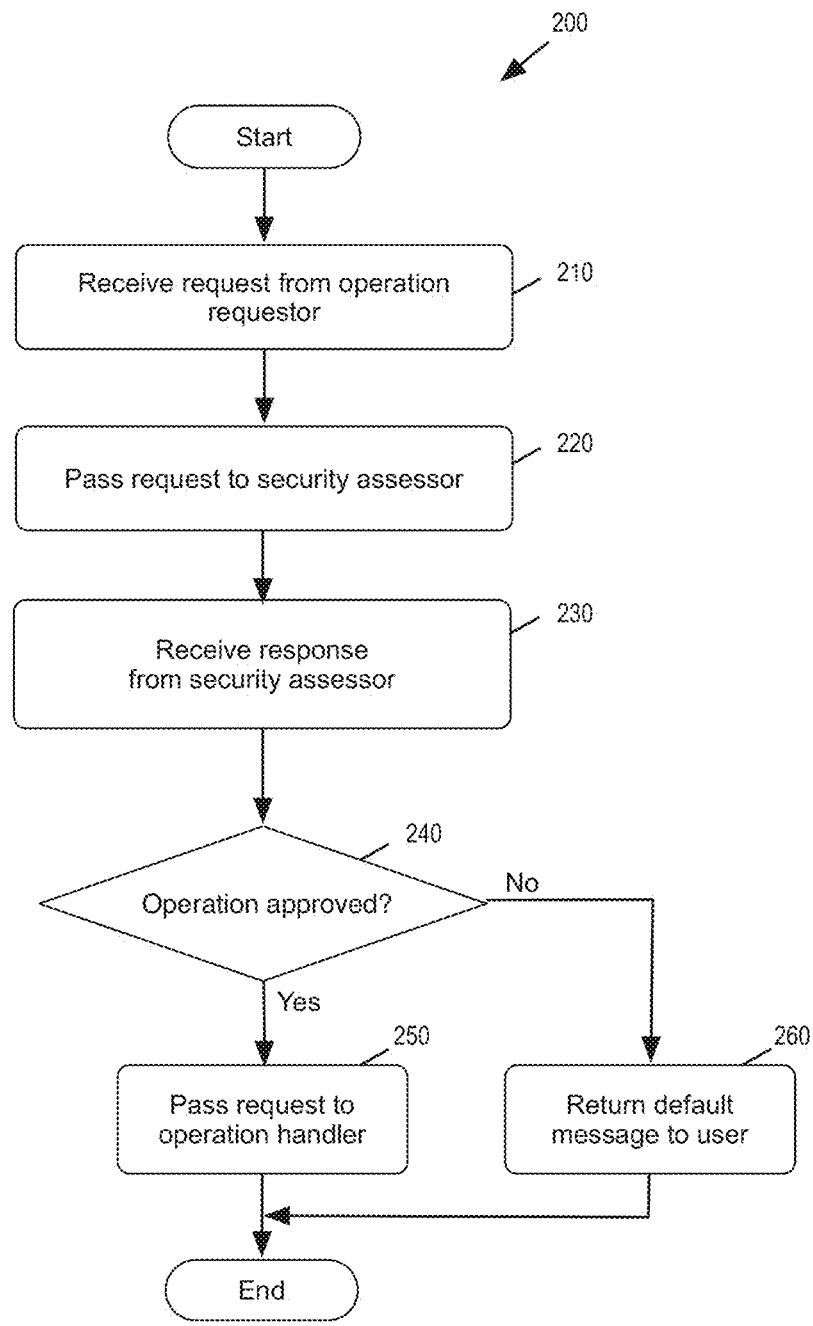
FIG. 2 conceptually illustrates a process that the operating system uses for handling and approving requested operations.

Once the operation initiator 130 receives the response from the security assessor 110 for the query, the operation initiator 130 enforces the security policy by allowing or not allowing (e.g., preventing) the particular operation to proceed. If the operation is allowed to proceed, the operation initiator 130 causes the installation module 170, the execution module 172, or the content opening module 174 to start performing the operation requested by the operation requestor 140. If the operation is not allowed, the operation initiator 130 notifies the operation requestor 140, which in turn notifies the user and terminates the requested operation. FIG. 2 below describes an example process that is performed by the operation initiator 130.

A signature embedded in a data object, when authenticated by its recipient, verifies that the data object is from a particular source. In some embodiments, the security assessor 110 authenticates the signature in the data object and ascertains the source of the data object. A data object that fails to produce a signature that can be authenticated (e.g., being defective or incomplete) by the security assessor is likely to be from an untrustworthy source. In such a situation, the security assessor 110, under the security policies of the operating system, informs the operation initiator 130 to prevent the data object from being executed or opened. (In some embodiments, a document or program with a signature that fails to be authenticated can never be allowed to proceed.) Conversely, if the security assessor 110 is able to authenticate the signature of the data object, the security assessor may inform the operation initiator that it is safe to proceed with the requested operation, assuming that other requirements under the security policy are also met (e.g., if the source of the data object is trustworthy).

The security policy implemented by some embodiments examines different data objects differently. For some types of data objects, security policies of the operating system may have further requirements that need to be satisfied in addition to authentication of a signature. For instance, the security policies may require authentication of a signature based on a chain of certificates, or require the source of the data object to be a particular vendor (even if the code signature authenticates successfully). In some embodiments, security policies can be altered by the user. For example, a trusted administrator of a computer may change the security policies of the operating system such that the security assessor would accept a particular data object without verifying or authenticating any signatures. In some embodiments, the security assessor 110 can be arbitrarily programmed to implement any security policy regarding any data object that is submitted by the operation initiator 130.

Figure 3:
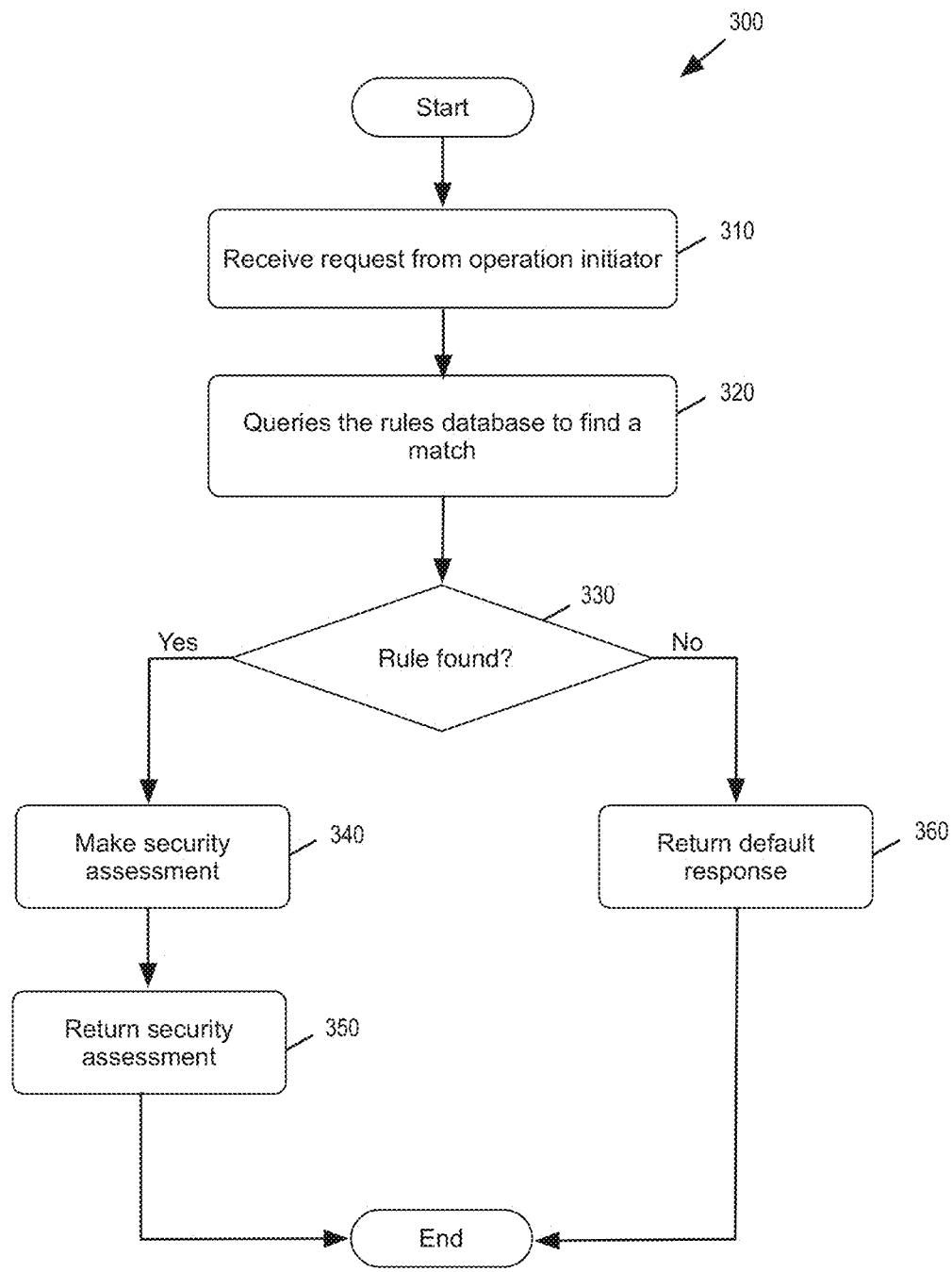
FIG. 3 conceptually illustrates an example process for performing a security assessment of a requested operation based on the security policies of the operating system.

In some embodiments, the security policies used to assess a data object are implemented as a set of instructions that the security assessor 110 executes in order to determine whether a data object complies with the security policies. In the example operating system of FIG. 1, the set of instructions implementing the security policies is stored in the rules database 120. The security assessor 110 retrieves the set of instructions from the rules database 120, and uses the retrieved instructions to (i) analyze the data object (e.g., to determine whether the source of the data object is acceptable) and to (ii) issue a response to the operation initiator 130 based on the analysis. Each set of one or more rules stored in the rules database is sometimes referred to as a "code requirement", because it specifies what is required of a data object (e.g., an executable program code such as application 150 or data file 160) in order for it to comply with the security policy of the operating system. FIG. 3 below describes an example process performed by the security assessor 110. Code requirements will be described below in further details by reference to FIGS. 9 and 13.

The rules database 120 is a database that stores the sets of instructions for implementing the security policies of the operating system 100. The security assessor 110 retrieves the sets of instructions from the rules database 120 in order to respond to the security query made by the operation initiator 130. The rules database is further described below, by reference to FIGS. 7-17.

FIG. 2 conceptually illustrates a process 200 that the operating system of some embodiments uses for handling and approving requested operations. Specifically, the process requests security assessments for the requested operations and launches operations that have been approved. In some embodiments, the process 200 is performed by a module within the operating system 100, such as the operation initiator 130 of FIG. 1.

The process 200 starts when it receives (at 210) an operation request (e.g., from the operation requestor 140). In some embodiments, the request is a user command for opening a document or executing an application. The request may also be prompted by a currently executing application or system process for performing a particular operation in the operating system.

Next, the process passes (at 220) the request to the security assessor. In the example of FIG. 1, the request also includes data objects (e.g., the application 150 or the data file 160) that are required for the security assessor to assess the security of the request under the security policy. For example, an operation request initiated by a user command to open a document may require multiple data objects to be passed to the security assessor because, in some cases, opening a document requires invocation of an application, and therefore, the request passed to the security assessor would include file handles of both the document and the application.

The process next receives (at 230) the response from the security assessor (e.g., 110) and determines (at 240) whether to approve the requested operation. In some embodiments, the response from the security assessor indicates (e.g., by informing the operation initiator 130) whether the request has passed the security policy of the operating system. The process 200 in some embodiments let the requested operation proceed if the response indicates that the request has passed the security assessment (e.g., having an authenticated signature and coming from a permissible source). The process 200 in some embodiments terminates or suspends the requested operation if the response indicates otherwise (e.g., the security assessor cannot authenticate the signature or the data object does not come from a permissible source.)

If the request is approved, the process 200 passes (at 250) the request to an operation handler capable of receiving the request and performing the approved operation. As illustrated in FIG. 1, several operation handlers are capable of receiving requests and performing operations, including the installation module 170, the execution module 172, and the content opening module 174. After passing the request to the operation handler, the process 200 ends.

On the other hand, if the process 200 does not approve the request, it returns (at 260) a default message to the operation requestor (e.g., 140 of FIG. 1), which in turn notifies the user (not shown). Furthermore, the process 200 does not pass the request to the operation handler when the request is not approved. Thus, none of the operation handlers, such as 170, 172, and 174, will perform the requested operation when the request is not approved. After returning the default message to the operation requestor, the process 200 ends.

Some embodiments perform variations of the process 200. For example, the specific operations of the process 200 may not be performed in the exact order shown and described. The specific operations may not be performed in one continuous series of operations, and different specific operations may be performed in different embodiments.

FIG. 3 conceptually illustrates an example process 300 for performing a security assessment of a requested operation based on the security policies of the operating system. Specifically, the process 300 uses a rules database for matching the request to a rule that enables the process to make a security assessment regarding the requested operation. In some embodiments, the process 300 is performed by a module in the operating system, such as the security assessor 110 of FIG. 1.

The process 300 starts when it receives (at 310) a request from the operation initiator. The request indicates that a security assessment is required for a particular requested operation.

Next, the process queries (at 320) the rules database to find a match. The process 300 examines entries in the rules database for rules that match or are applicable to the request. A rule that does not match the request cannot be used to make a security assessment for the request. For example, a rule for checking an application with a specific name cannot be used to check an application with a different name. As will be discussed further below, multiple entries in the rules database may simultaneously match the request, and only the rule with the highest priority will be applied.

The process then determines (at 330) whether a matching or applicable rule has been found in the rules database. If the process 300 finds at least one matching rule, the process proceeds to 340. Otherwise the process proceeds to 360.

At 360, the process returns a default response to the operation initiator to indicate that there are no applicable rules or instructions regarding the request. In some embodiments, the default security policy is to disallow a request for an operation that has no matching rules in the rules database. In some embodiments, the default security policy allows requests that are not specifically prohibited by the rules database. In some embodiments, the default policy requires the operating system to notify the user. After returning the default response, the process 300 ends.

At 340, the process makes the security assessment regarding the request. In some embodiments, the process performs the security assessment by applying the matching rules or the applicable set of instructions to the data objects associated with the request (e.g., application 150 and/or data file 160). In some embodiments, the matching set of rules executes in the security assessor as an executable program. In some embodiments, the matching set of rules causes the security assessor to make the security assessment based on variables such as the source of the data object, the identity of the data object, and the type of the data object.

Once the security assessment has been made, the process returns (at 350) the security assessment to the operation initiator to decide whether or not to allow the requested operation to proceed. The process 300 ends after it has returned the security assessment to the operation initiator.

Some embodiments perform variations of the process 300. For example, the specific operations of the process 300 may not be performed in the exact order shown and described. The specific operations may not be performed in one continuous series of operations, and different specific operations may be performed in different embodiments.

Figure 4:
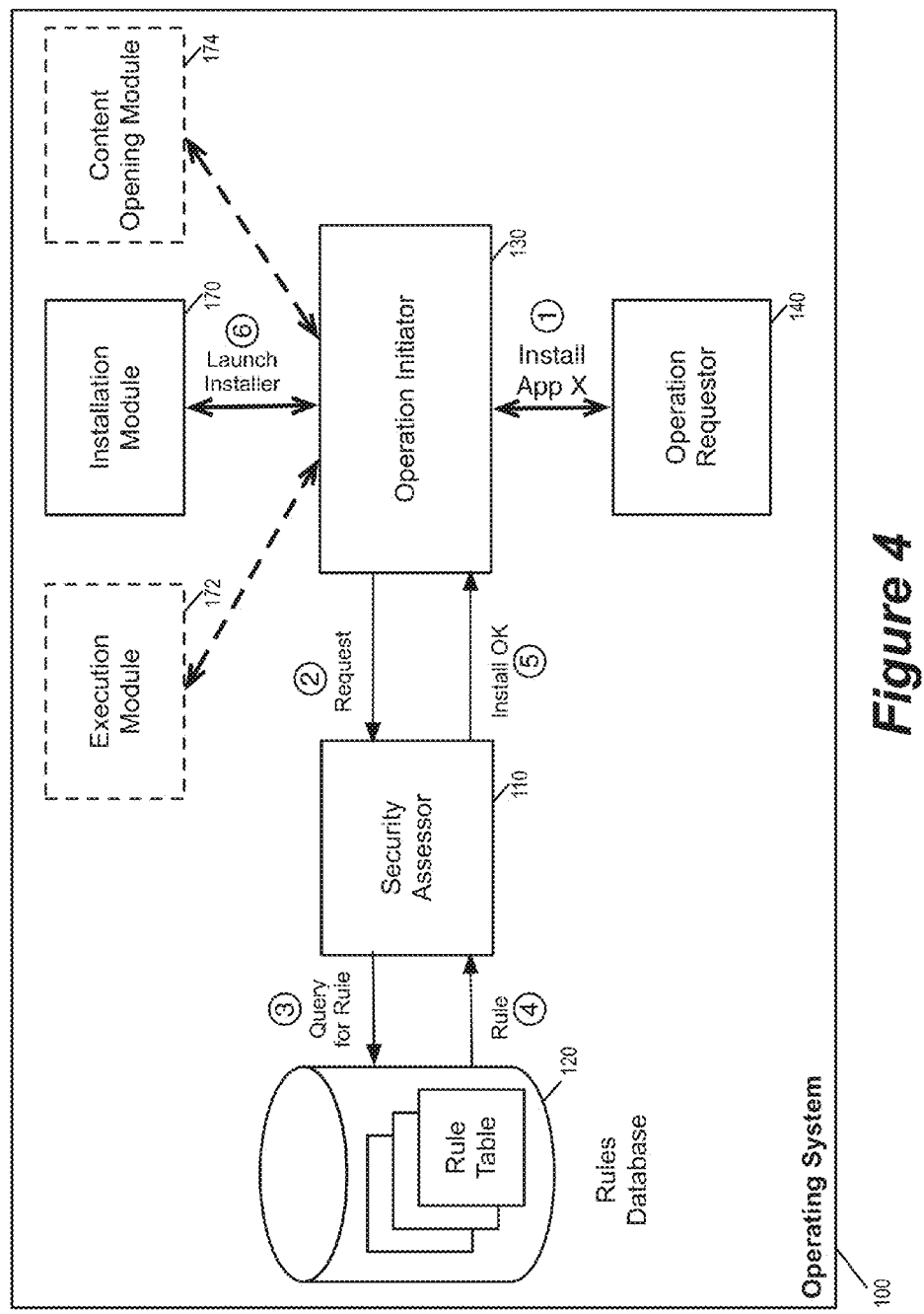
FIGS. 4-6 illustrate the flow of data in an operating system when performing security assessment using the security assessor and the rules database.
Figure 5:
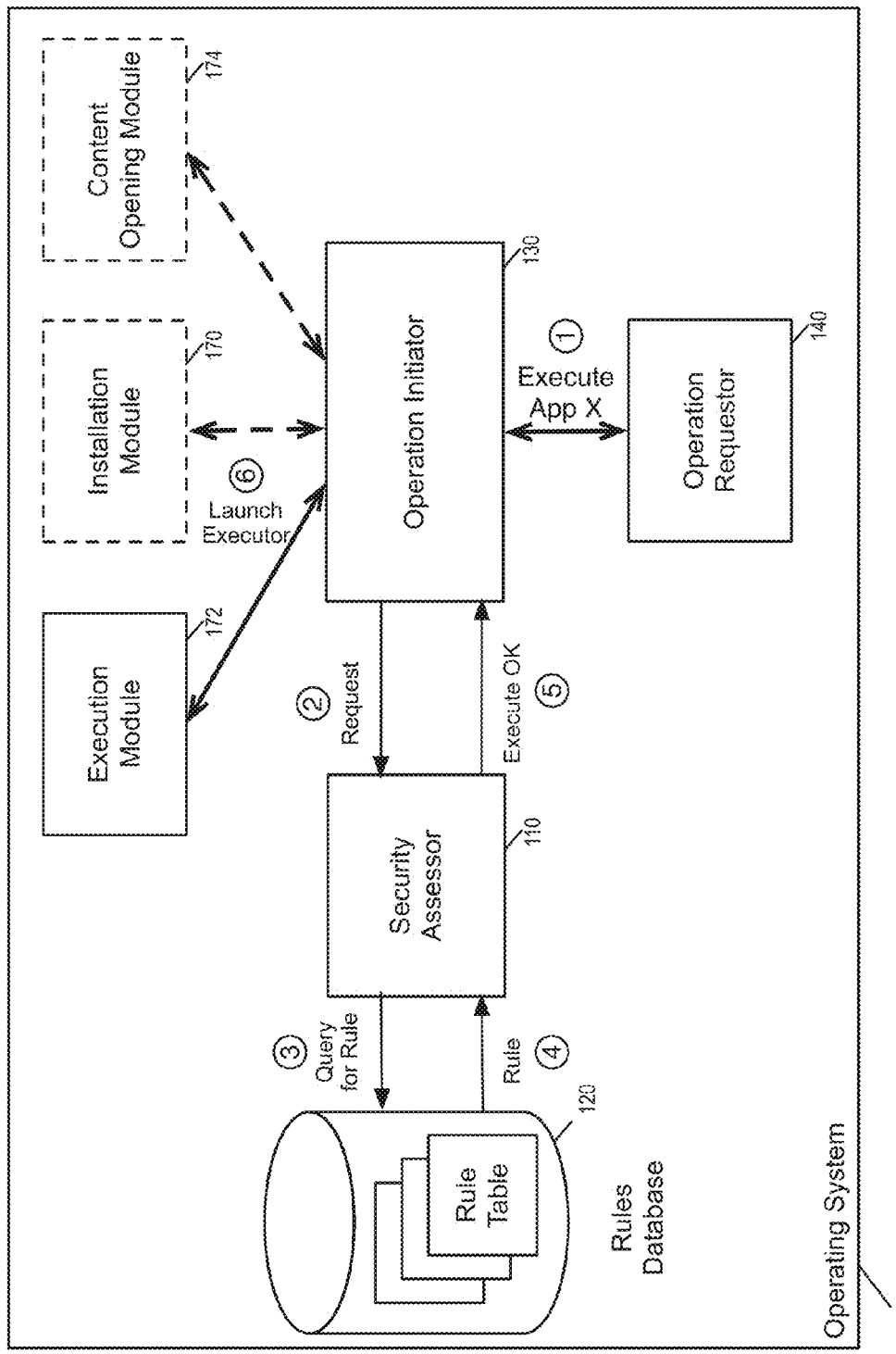
Figure 6:
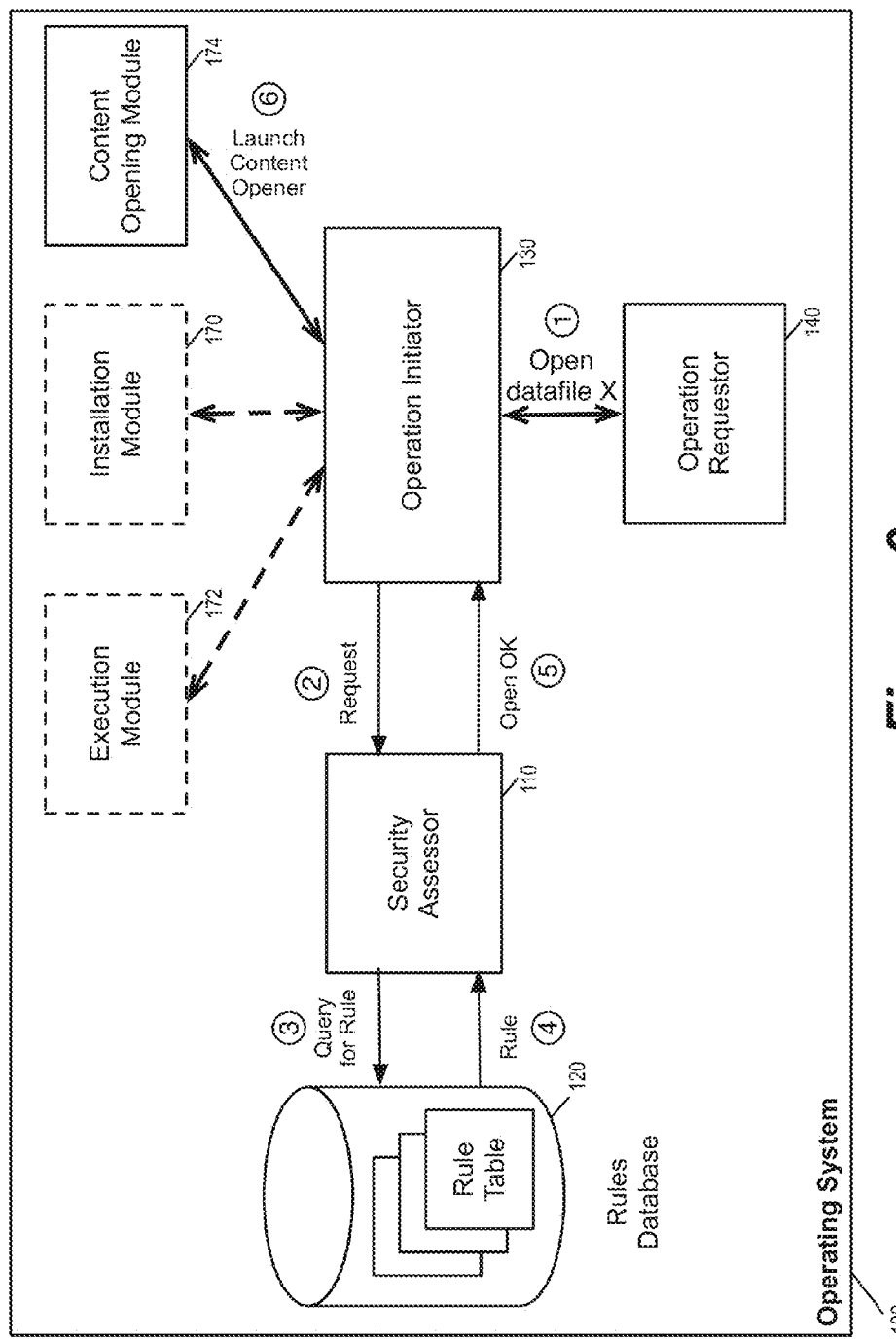

FIGS. 4-6 illustrate the flow of data in the operating system 100 when performing security assessment using the security assessor and the rules database. As in FIG. 1, the operating system 100 in FIGS. 4-6 includes the security assessor 110, the rules database 120, the operation initiator 130, the operation requestor 140, the installation module 170, the execution module 172, and the content opening module 174.

FIG. 4 illustrates the data flow within the operating system 100 when the requested operation is for installing an application. The operation data flow starts at the operation requestor 140 when it makes a request to the operation initiator 130 for installing Application X (operation '1'). This request, in some embodiments, is based on a user command to install Application X. The user command may be received by the way of a user interface.

The operation initiator 130 then makes a request (operation '2') to the security assessor 110 to assess the security of installing Application X under the security policies of the operating system. In some embodiments, this request to the security assessor 110 includes handles to data objects that are necessary for installing Application X, such as installation files and packages.

The security assessor 110, upon receiving the request, queries (operation '3') the rules database 120 for rules or instructions that match the installation request under the security policy. The rules database provides (operation '4') the rules or instructions that match the query in its database to the security assessor 110. This query process between the security assessor 110 and the rules database 120 continues until a matching rule is found in the rules database or a determination is made that there is no applicable rule in the rules database.

Once a matching rule has been found, the security assessor 110 performs a security assessment by applying the matching rules to the data objects related to the installation of Application X. In some embodiments, the rules take the form of program instructions for processing the data objects and determining whether the data objects comply with the security policies of the operating system. The processing of the data objects, in some embodiments, includes verifying, within the data objects, signatures related to the installation of Application X. In some embodiments, compliance with the security policies is determined based on whether the signature has authenticated successfully and whether the signature is from a trusted source. The security assessment is then communicated back to the operation initiator 130 (operation '5'). In the example illustrated in FIG. 4, the security assessor indicates that it is OK to install Application X. This is the security assessment because data objects related to the installation of Application X have been found to comply with the security polices stored in the rules database.

After receiving the security assessment that it is OK to install Application X, the operation initiator 130 commands the installation module 170 to launch the installer and install Application X into the computer. The dashed lines around execution module 172 and content opening module 174 indicate that this operation does not involve those two modules.

FIG. 5 is similar to FIG. 4, except that instead of illustrating data flow for an installation operation, FIG. 5 illustrates the data flow within the operating system 100 when the requested operation is for executing (e.g., launching or invoking) an application. The operation data flow starts at the operation requestor 140 when it makes a request for executing Application X (operation '1') to the operation initiator 130. This request, in some embodiments, is a user command to execute Application X. The user command may be received by the way of a user interface.

The operation initiator 130 then makes a request (operation '2') to the security assessor to assess the security of executing Application X under the security policies of the operating system. In some embodiments, this request includes handles to data objects that are necessary for executing Application X, such as the executable machine code of Application X.

The security assessor 110, upon receiving the request, queries (operation '3') the rules database 120 for rules or instructions that match the request to execute the application under the security policy. The rules database provides (operation '4') the rules or instructions that satisfy the query in its database to the security assessor 110. This query process between the security assessor 110 and the rules database 120 continues until a matching rule is found in the rules database or a determination is made that there is no applicable rule in the rules database.

Once a matching rule has been found, the security assessor 110 performs a security assessment by applying the matching rules to the data objects related to the execution of Application X. In some embodiments, the rules take the form of program instructions for processing the data objects and determining whether the data objects comply with the security policies of the operating system. The processing of the data objects, in some embodiments, includes verifying, within the data objects, signatures related to the execution of Application X. In some embodiments, compliance with the security policies is determined based on whether the signature has authenticated successfully and whether the signature is from a trusted source. The security assessment is then communicated back to the operation initiator 130 (operation '5'). In the example of FIG. 5, the security assessor indicates that it is OK to execute Application X. This is the security assessment because data objects related to the execution of Application X have been found to comply with the security polices stored in the rules database.

After receiving the security assessment that it is OK to execute Application X, the operation initiator 130 commands the execution module 172 to launch Application X. The dashed lines around installation module 170 and content opening module 174 indicates that this operation does not involve those two modules.

FIG. 6 is similar to the previous two figures, except that the data flow of FIG. 6 is based on a request to open a document. The data flow begins at the operation requestor 140 when it makes a request for opening a document data file X (operation '1') to the operation initiator 130. This request, in some embodiments, is a user command to open the data file X. The user command may be received by the way of a user interface.

The operation initiator 130 then makes a request (operation '2') to the security assessor to assess the security of opening data file X under the security policies of the operating system. In some embodiments, this request includes handles to data file X. If data file X is a document that is to be opened by application Y, then this request in some embodiments also includes handles to the executable binary files of application Y. In this instance, both document X and application Y are considered necessary data objects for opening document X. Therefore, the security assessment is performed on both of these data objects. However, in some embodiments, the application necessary for opening data file X is already executing (and, thus, has already passed a security assessment, such as in the example of FIG. 5). Therefore, only the handle for data file X is passed to the security assessor as part of the request.

The security assessor 110, upon receiving the request, queries (operation '3') the rules database 120 for rules or instructions that matches the document opening request under the security policy. The rules database provides (operation '4') the rules or instructions in its database to the security assessor 110. This query process between the security assessor 110 and the rules database 120 continues until a matching rule is found in the rules database or until a determination is made that there is no applicable rule in the rules database.

Once a matching rule has been found, the security assessor 110 applies the matching rules to the data objects related to opening the data file X (e.g., application Y). In some embodiments, the rules take the form of program instructions that process the data objects and make a determination as to whether those data objects comply with the security policies of the operating system. The processing of the data objects in some embodiments includes verifying signatures within the data objects related to opening of data file X. The determination is made in some embodiments based on whether the signature has authenticated successfully and whether the signature is from a trusted source. The security assessment is then communicated back to the operation initiator 130 (operation '5'). In the example of FIG. 6, the security assessor indicates that it is OK to open data file X. This is the security assessment because the data objects related to the opening of data file X (e.g., data file X itself and application Y) have been found to comply with the security polices stored in the rules database.

After receiving the security assessment that it is OK to open data file X, the operation initiator 130 commands the content opening module 174 to launch Application X. The dashed lines around the execution module 172 and the installation module 170 indicate that this operation does not involve those two modules. In some embodiments, when the opening of a document requires the execution of an application that is not currently being executed in the computer, the operation initiator will also launch the execution module 172.

II. Rules Database

In the examples described above, data objects associated with requested operations are assessed according to the security policies of the operating system. These security policies are embodied in different rules or instructions stored in the rules database. The "security policies of the operating system" are thus a set of programmable rules that controls the operations taking place in the operating system but is not part of the programs of the operating system itself. As will be discussed in Section II-C, these "security policies of the operating system" can be altered by users or vendor of the computer system.

In some embodiments, the rules database includes different tables in order to make queries on the rules database more efficient. Two such tables—an authority table and a cache table—are described below.

A. Authority Table

The rules database in some embodiments includes an authority table. In such some embodiments, the authority table contains the rules that the security assessor retrieves for determining whether to allow a particular operation to take place in an operating system. The rules in the authority table specify what is required of data objects (e.g., program code or documents to open) in order for them to comply with the computer's security policy. Hence each set of one or more of these rules is referred to as a "code requirement" in some embodiments.

Code requirements can express arbitrary conditions on the certificates used to sign the subject, such as requiring the vendor ID and/or the public key in the certificate to belong to a particular trusted source. Code requirement can also require other things, such as entries in configuration dictionaries that are integral parts of these programs. For example, a code requirement may state "must have an entitlement permitting address book use" (entitlements being one of those configuration dictionaries specified by some for inclusion in programs), which has nothing to do with its signature.

Figure 7:
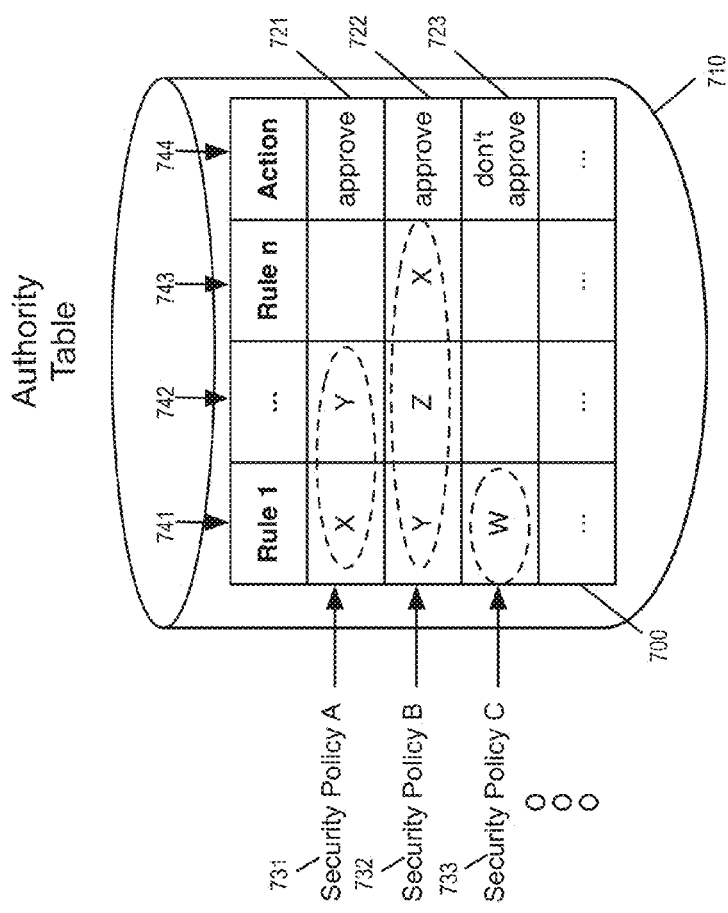
FIG. 7 conceptually illustrates an authority table that stores the rules or instructions for determining security policies of an operating system.

FIG. 7 conceptually illustrates an authority table 700 that stores the rules or instructions for determining security policies of an operating system. The authority table 700 includes a set of entries or records, each entry or record storing a set of one or more rules or instructions that specifies a code requirement. A particular security policy can be expressed by one or more entries in the authority table.

As illustrated, a storage device 710 stores the authority table 700, which includes several entries or records, including records 721, 722, and 723. The records express several security policies, including polices 731, 732, and 733. Each record or entry also includes a set of fields 741-744. The fields 741-743 are labeled 'Rule 1' to 'Rule n'. The field 744 is labeled 'Action'.

Each field of a record is a set of rules or instructions that directs the security assessor of the operating system to perform a set of logical or arithmetic operations and make a decision according to the set of logical or arithmetic operations. For example, the 'X' in the field 741 of the record 721 can be a set of operations that check to see if the security assessment is for an application, the 'Y' in the field 742 of the record 721 can be a set of operations that checks expiration date of the certificate, the 'Z' in the field 742 of the record 722 can be a rule that verifies whether the application is from a trusted vendor or source, while the 'W' in the field 741 can be a rule that checks whether a file being opened is a file downloaded from the Internet. An entry does not have to have all fields filled. For example, the entry 723 has only one filled rule field (741). The instruction in that field for record 723 can be a check of whether a document that is requested to be opened is downloaded from Internet.

The different sets of instructions in the different fields of a record jointly make a single determination. This single determination is used to decide whether the action stated in the 'Action' field 744 should be undertaken. For example, the 'approve' in the action field 744 of the record 722 would cause the security assessor to approve the request to launch a particular application if the data object being evaluated is an application, has a certificate that has been verified under X.509 standard, and comes from a trusted vendor. On the other hand, while the 'disapprove' of the entry 723 would cause the security assessor to disapprove a request to open a particular content item if it is downloaded from the Internet.

Such a collection of instructions or requirements constitutes a security policy. In the example of FIG. 7, the rules or instructions in the record 721 constitute security policy A 731, the rules or instructions in the record 722 constitute security policy B 732, and the rules or instructions in the record 723 constitute security policy C 733. In some embodiments, a security policy is a collection of rules that span two or more records in the authority table. Such an authority table is further discussed below by reference to FIG. 10.

In some embodiments, some of the rules are for matching and some of the rules are for verification. The rules for matching determine whether the particular entry is applicable to the request for the security assessment. The rules for verification determine whether the request complies with the security policy embodied by the particular entry or record of the rules table. For example, a rule that rejects a type of data object from a particular vendor is a rule for verification, while a rule that limits the applicability of the rule to gaming applications is a rule for matching.

Figure 8:
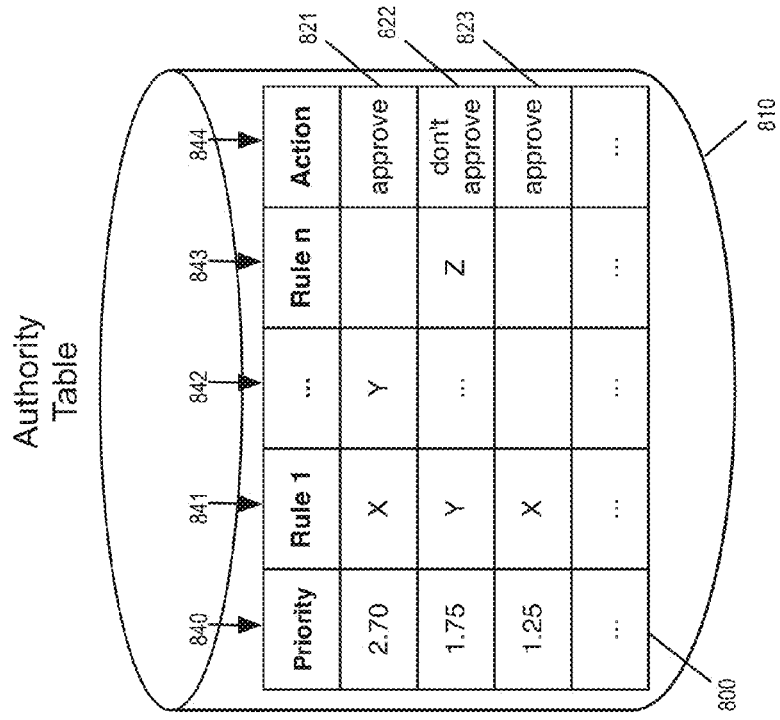
FIG. 8 conceptually illustrates an authority table that includes an additional field.

In addition to rule fields and a field for action, some embodiments include other fields. FIG. 8 conceptually illustrates an authority table 800 that is similar to the authority table 700, except that, in addition to the rule fields and the action field illustrated in FIG. 7, the authority table 800 includes an additional field. The authority table 800 also has a number of entries (821-823), and each entry has a number of fields (840-844). These fields include rule fields (841-843) and an action field (844). Unlike the authority table 700, however, each entry in the authority table 800 also includes a priority field 840.

The priority field 840 of some embodiments decides which entry in the authority table will be examined first for finding rules that matches the request. Entries with higher priority value in the priority field will be examined before entries with lower priority values. As illustrated in FIG. 8, record 822 has a priority value of 1.75 in the priority field 840 while record 823 has a priority value of 1.25. The record 822 will therefore be searched before the record 823, while the record 821 (having a priority value of 2.70) will be searched before both records 822 and 823. Priority of entries can be expressed in other ways (e.g., by using integer number, by arranging the entries in a linked list from highest priority to the lowest priority, or by sorting the entries according to priority.)

For any given security assessment request, multiple entries of the authority table may match the request. However, in some embodiments, the security assessor stops searching the authority table when a matching entry is found. For example, for a search that could have multiple matches, the security assessor will simply use the first matching entry, which is the highest priority matching entry. The use of a priority field, therefore, alleviates the possibility of multiple matches, ensuring that only a single matching entry is used for the security assessment.

In the examples of FIGS. 7 and 8, an entry in an authority table includes several fields, including several rule fields that each contains a set of instructions for performing a set of logical or arithmetic operations. However, some embodiments express the sets of instructions of all the rule fields as a single rule and have only a single rule field in the authority table. The single rule field in a record of the authority table encompasses all of the necessary instructions for making the security assessment under a particular security policy.

Figure 9:
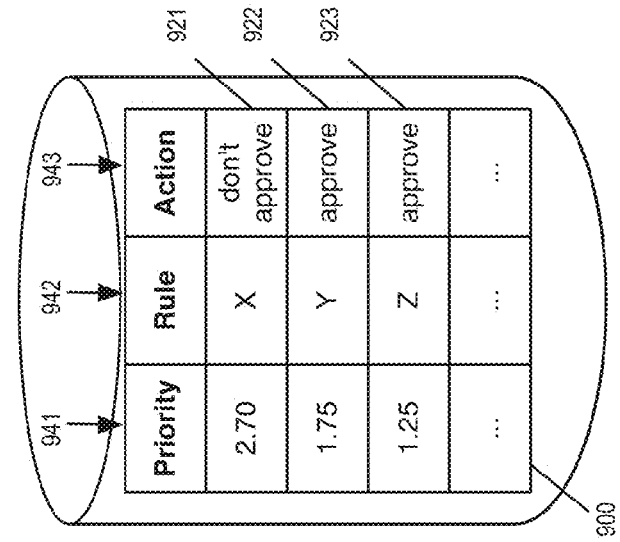
FIG. 9 conceptually illustrates an authority table that includes only one rule field in each record or entry.

FIG. 9 conceptually illustrates an authority table 900 of some other embodiments that includes only one rule field in each record or entry. The authority table 900 is similar to the authority table 800, including a priority field 941, an action field 943, and a number of entries (921-923). However, unlike the authority table 800, which includes several rule fields, the authority table 900 includes only one rule field 942.

The code requirement that includes rule field 942 for each record or entry, includes all of the necessary instructions for performing a security assessment for a request, including both matching and verifying instructions. In some embodiments, the code requirement, as mentioned before, can be a set of one or more concatenated rules. In such some embodiments, the code requirement applies to the requested data object in order to validate the source of the data object. For example, a set of instructions in the code requirement that includes rule field 942 for entry 921 can make each of the following determinations: (1) whether the request for the security assessment is for an application; (2) whether the application is from a trusted vendor or source; and (3) whether the source identifying information in the certificate (e.g., vendor ID, public key, etc.) indeed belongs to the trusted vendor or source. Only when each of the three determinations satisfies its corresponding rule, will the action in the action field 943 be applied. On the other hand, when one or more of the three determinations fail to satisfy its corresponding rule, the action field of the record will not be applied. Thus, the action prescribed by the action field is based on the single rule for the record, and would be communicated to the security assessor (e.g., approval or disapproval of the requested action).

The authority table can have different formats from those that are illustrated in FIGS. 7-10. For example, an authority table entry, in some embodiment, can include a field called "disable" such that, when the disable field contains a certain value, the entry can be skipped and the security assessor will not consider the entry in the search.

As mentioned earlier by reference to FIG. 7, the security policies of the operating system are expressed by the rules and instructions in the rules database. In some embodiments, each entry in the authority table is sufficient to express one particular security policy (e.g., allowing only applications that have a valid signature from a specific vendor). In some embodiments, a security policy can be expressed by two or more entries in the authority table.

Figure 10:
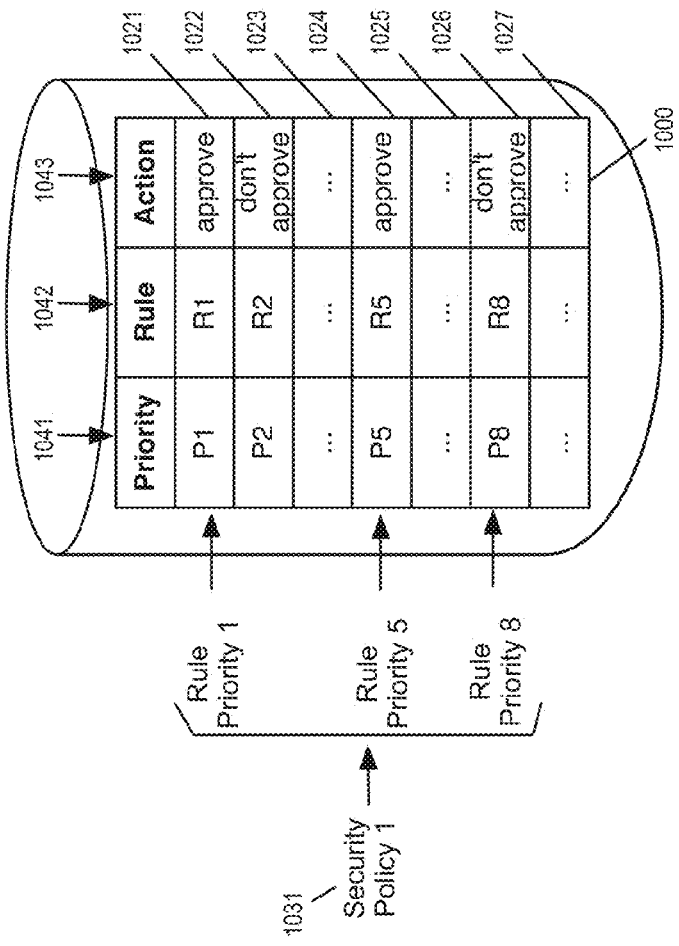
FIG. 10 illustrates an authority table, in which multiple entries are used to express a single security policy.

FIG. 10 illustrates an authority table 1000, in which multiple entries are used to express a single security policy. FIG. 10 will be described by reference to FIGS. 11 and 12. The authority table 1000 is similar to the authority table 900. It has a number of entries (1021-1027) and each of the entries has three fields (a priority field 1041, a rule field 1042, and an action field 1043). However, FIG. 10 also illustrates an example security policy 1031 ('security policy 1') that is implemented by three entries of the authority table (the entries 1021, 1024, and 1026). The three entries of the security policy have different priorities (P1, P5, and P8) such that only the entry with the highest matching priority is used to make the security assessment. In this example, P1 has the highest priority, P5's priority is lower than that of P1, and P8 has the lowest priority.

Figure 11:
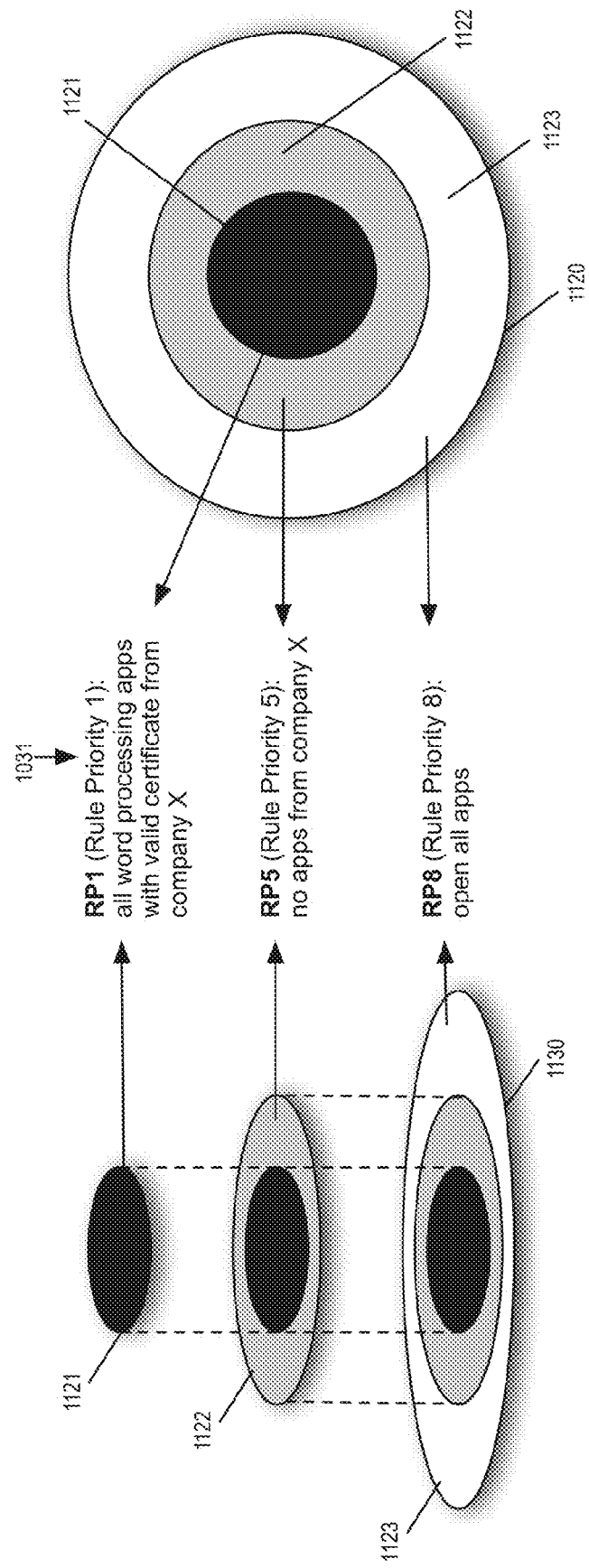
FIG. 11 illustrates a set of Venn diagrams for an example security policy.

FIG. 11 illustrates a set of Venn diagrams for the example security policy 1031 of FIG. 10. The diagrams illustrate the logical relationships among the three authority table entries (P1, P5, and P8). The diagrams also illustrate the construction of the example security policy 1031 by the use of priorities.

FIG. 11 includes the security policy 1031, a two-dimensional Venn diagram 1120 and a three-dimensional diagram 1130. The security policy 1031 includes a record (or a set of instructions) for priority P1, a record for priority P5, and a record for priority P8. The rules in the record with priority P1 (i.e., 1021) would allow "all word processing apps with valid certificate from company X". The rules in the record with priority P5 (i.e., 1024) would allow "no apps from company X". The rules in the record with priority P8 (i.e., 1026) would allow the opening of all applications. In some embodiments, a certificate is considered "valid" if its signature has been authenticated.

The 2-D Venn diagram 1120 includes three ovals 1121-1123. The 3-D diagram 1130 illustrates the same three ovals in a three dimensional fashion. The oval 1121 represents the rules with priority P1, the oval 1122 represents the rules with priority P5, and the oval 1123 represents the rules with priority P8.

The 2-D Venn diagram 1120 thus illustrates the logical relationships among the three authority table entries. Within the Venn diagram 1120, the oval 1123 encompasses the ovals 1122 and 1121, and the oval 1122 encompasses the oval 1121. This corresponds to the logical relationships between the rules in the three records, where the applicability of the P1 rule, "all word processing apps with valid certificate from company X," is a subset of the applicability of P5 rule "apps from company X", and the applicability of the P5 rule is a subset of the applicable of P8 rule "all apps".

The 3-D diagram illustrates how the use of the priority field in the authority table decides which of the rules within the security policy 1031 should be applied to make the security assessment. As illustrated, the oval 1121 is the highest and corresponds to the highest priority rule (P1) in the security policy 1031. The oval 1122 is the second highest and corresponds to the next highest priority rule (P5) in the security policy 1031. The oval 1123 is the lowest and corresponds to the lowest priority rule (P8) in the security policy 1031. A higher priority rule supersedes lower priority rules where they intersect, just as higher priority ovals overshadow lower priority ovals whenever they intersect. The applicability of higher priority rules effectively punches holes in the applicability of the lower priority rules.

The security policy 1031 thus can be constructed using multiple entries in the authority table 1000 without logical inconsistency when performing security assessments. The use of the priority field resolves the issue of which rules to use when different entries in the authority table apply to the same request.

Figure 12:
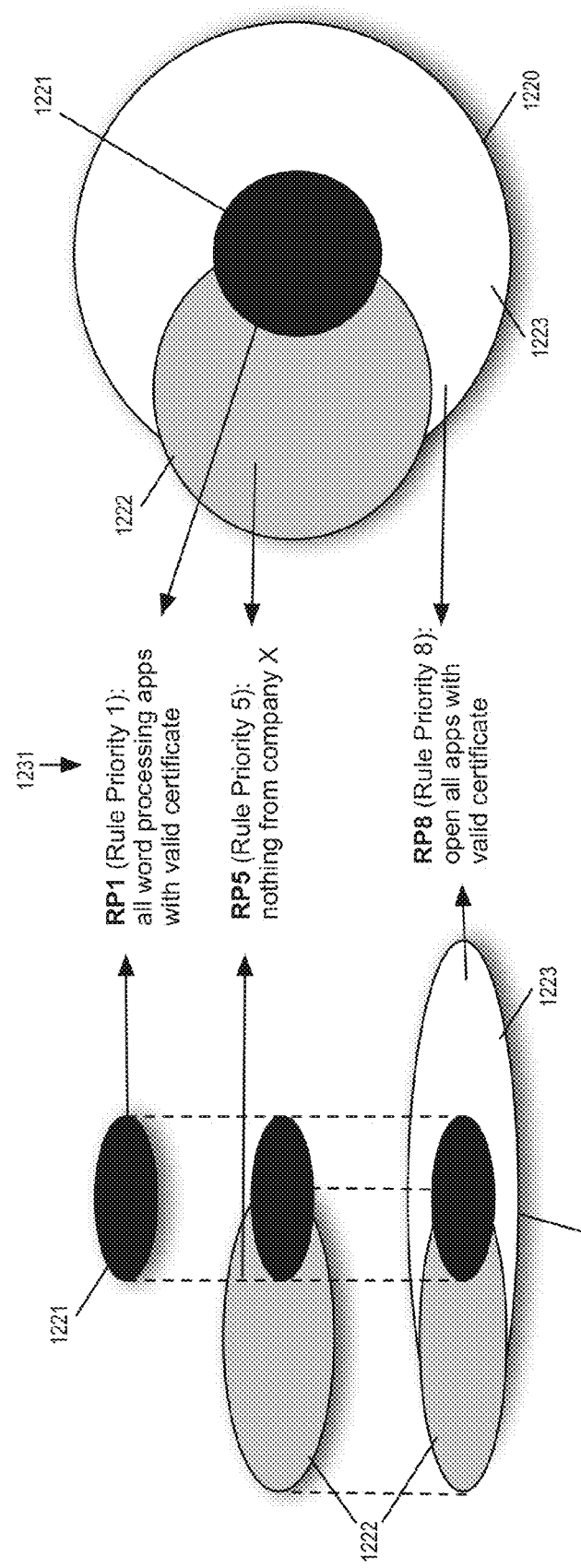
FIG. 12 illustrates a set of Venn diagrams for another example security policy.

FIG. 12 illustrates a set of Venn diagrams for another example security policy 1231. The diagrams illustrate the logical relationships among the three authority table entries (P1, P5, and P8). The diagrams also illustrate the construction of the example security policy 1231 by the use of priorities. The authority table entries in the security policy 1231, unlike the authority table entries in the security policy 1031, are not necessarily subsets of each other.

FIG. 12 includes the security policy 1231, a two-dimensional Venn diagram 1220 and a three-dimensional diagram 1230. The security policy 1231 includes a record (or a set of instructions) for priority P1, a record for priority P5, and a record for priority P8. The rules in the record with priority P1 would allow "all word processing apps with valid certificate". The rules in the record with priority P5 would allow "nothing from company X". The rules in the record with priority P8 would allow the opening of all applications with a valid certificate.

The Venn diagram 1220 includes three ovals 1221-1223. The 3-D diagram 1230 illustrates the same three ovals in a three dimensional fashion. The oval 1221 represents the rules with priority P1, the oval 1222 represents the rules with priority P5, and the oval 1223 represents the rules with priority P8.

The 2-D Venn diagram thus illustrates the logical relationships among the three authority table entries. Within the Venn diagram 1220, the oval 1223 encompasses the oval 1221, while the oval 1222 overlaps both the ovals 1221 and 1223. This corresponds to the logical relationships between the rules in the three records. Specifically, the applicability of the P1 rule, "all word processing apps with valid certificate", is a subset of the applicability of the P8 rule "all apps with valid certificate". The applicability of the P5 rule, "nothing from company X", intersects both the P1 and P8 records without being their subset or their superset.

The 3-D diagram 1230 illustrates how the use of the priority field in the authority table decides which of the rules within the security policy 1231 should be applied to make the security assessment. As illustrated, the oval 1221 is the highest and corresponds to the highest priority rule (P1) in the security policy 1231. The oval 1222 is the second highest and corresponds to the next highest priority rule (P5) in the security policy 1231. The oval 1223 is the lowest and corresponds to the lowest priority rule (P8) in the security policy 1231. A higher priority rule supersedes lower priority rules when they intersect, just as higher priority oval overshadows lower priority ovals whenever they intersect.

The security policy 1231 thus can be constructed using multiple entries in the authority table without logical inconsistency when performing security assessment. The use of the priority field resolves the issue of which rules to use when different entries in the authority table apply to the same request. For example, a request for a word processor with a valid certificate from company X would result in the word processor being approved, since the rule for "all word processing apps with valid certificate" has higher priority than "nothing from company X". As another example, a request for a web browser application with a valid certificate from company X would not be approved, because the rule for "nothing from company X" has a higher priority than "all apps with valid certificate".

Figure 13:
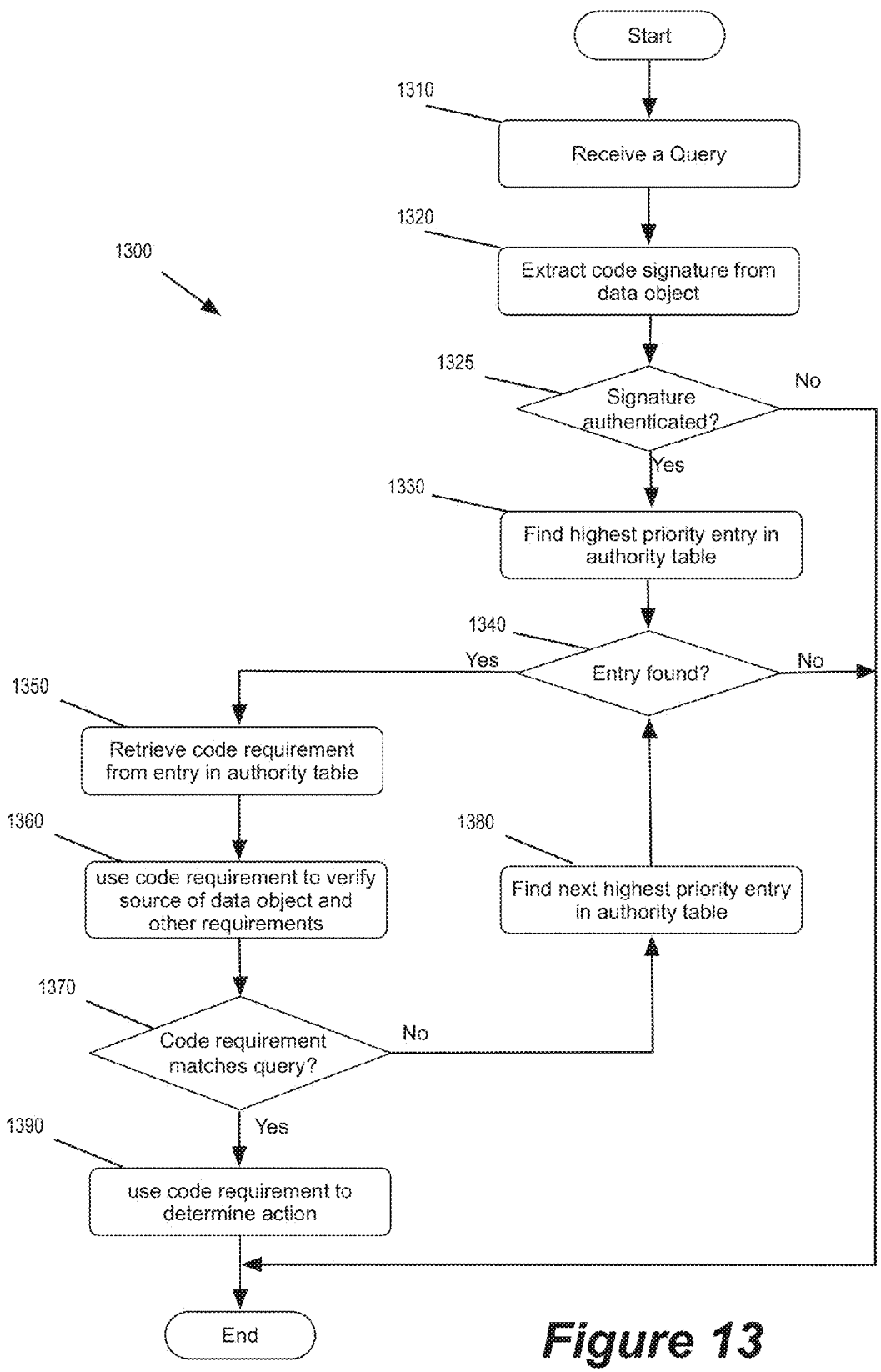
FIG. 13 conceptually illustrates a process for performing a security assessment by using the authority table.

For some embodiments, FIG. 13 conceptually illustrates a process 1300 for performing a security assessment by using the authority table. The process receives a security assessment request and matches entries (or records) of the authority table with the request. The process then performs the security assessment by verifying whether the data object of the request complies with the code requirement stored in the authority table.

The process 1300 starts when it receives (at 1310) a query or a request to make a security assessment. The request is accompanied by a data object (e.g., an application program code, an installation package, or a document to be opened) to which the code requirement stored in the authority table will be applied.

The process next extracts (at 1320) a code signature from the data object. In some embodiments, the signature is extracted from a public key certificate issued by the source of the data object. The process then determines (at 1325) whether the extracted signature is authenticated. In some embodiments, a separate module in the security assessor performs the code signature authentication (e.g., code signature verifier module). Once the code signature has been extracted, the process uses the code signature verifier module to check whether the code signature has been authenticated successfully. If the signature authenticates successfully, the process proceeds to 1330. If the signature does not authenticate successfully, the process 1300 ends.

The process next finds (at 1330) the highest priority entry in the authority table. In some embodiments, the process 1300 compares the priority fields of each entry in the authority table in order to determine which entry has the highest priority. The process then determines (at 1340) whether the entry has been found. In some embodiments, this is accomplished by recording which entries have already been examined. If all of the entries in the authority table have already been examined, then there is no more entry to be found. If the highest priority entry is found, the process proceeds to 1350. If there is no more entry to be examined in the authority table, the process 1300 ends.

At 1350, the process retrieves the code requirement from the authority table entry that was found. The process then uses (at 1360) the retrieved code requirement to verify the source of the data object. Such verification can include the verification of the vendor ID and the expiration date of the certificate that is used to generate the signature. The retrieved code requirement is also used to verify other required attributes of the data object, attributes such as type of the data object, name of the data object, or any other attributes that can be associated with a data object. Thus, for example, even if the process is able to authenticate the signature from the data object, the process can still reject the data object if it does not satisfy the code requirement (e.g., if it does not possess the correct type or does not come from a source that is deemed trustworthy).

The process then determines (at 1370) whether the code requirement matches or is applicable to the query. A security assessment cannot be made based on a code requirement that is not applicable to the request. Some embodiments do not check the applicability of the code requirement until this point of the process because the applicability of a code requirement sometimes cannot be determined until the process has used the code requirement to process the data object of the request. In some embodiments, the process checks the applicability of the code requirement as soon as sufficient information is available. If the code requirement matches (i.e., is applicable) the query, the process proceeds to 1390. Otherwise, the process proceeds to 1380.

At 1380, the process searches the authority table for the next highest priority entry. Some embodiments mark the higher prior entries that were previously examined, and the next highest priority entry is simply the highest priority entry that has not been marked. The process next determines (at 1325) whether the entry is found. If so the process returns to 1330. Otherwise, the process 1300 ends.

At 1390, the process uses the code requirement to determine the action that should be undertaken by the operation initiator. In some embodiments, this action is specified by the action field of the matched entry (i.e., to approve or disapprove) depending on whether data object has satisfied the code requirement. After responding to the request, the process 1300 ends.

B. Cache Table

Performing security assessment using entries in the authority table in some embodiments can include many computations. A rule that verifies information embedded in a certificate can include computationally intensive operations in some embodiments. Furthermore, traversal across many entries in the authority table may be necessary to complete a search for an entry that matches the request. For example, to ensure that a request has no matching entries, a complete traversal of the authority table may be necessary. Some embodiments save security assessment time by performing security assessment operations only on data objects that have not yet been assessed. In other words, query is made to the authority table only when an application program is launched for the first time or only when a data file is opened for the first time.

To further accelerate security assessment operations, the rules database of some embodiments incorporates a cache table in addition to the authority table. In some embodiments, a cache table stores the required action for a data object in an address location indexed by a hash value that is unique to that data object. For example, a unique code directory hash value can be computed for an application program or a data file. Thus, a request for a security assessment for execution (or installation) of an application or opening an archive (will be described in more detail below in Section IV by reference to FIGS. 24 and 25) requires only the computation of the hash value of the application executable, the installation file, or the archive. The action (e.g., approve or disapprove) is then retrieved from the address location of the cache table pointed to by the hash index value.

Unlike a query of the authority table, a query of the cache table does not require traversal of multiple entries nor lengthy computation according to the rules. A request for assessment of an operation involving a data object that has a corresponding entry in the cache table can thus be greatly accelerated. In some embodiments, a request for a security assessment first attempts to find a matching entry in the cache table before searching the authority table. A cache table is also called an object table, since each entry in the cache table corresponds to one data object (e.g., an application executable or a document). Since users tend to interact with data objects that they have recently interacted with (and hence with entries in the cache table), the use of the cache table significantly reduces security assessment time.

Figure 14:
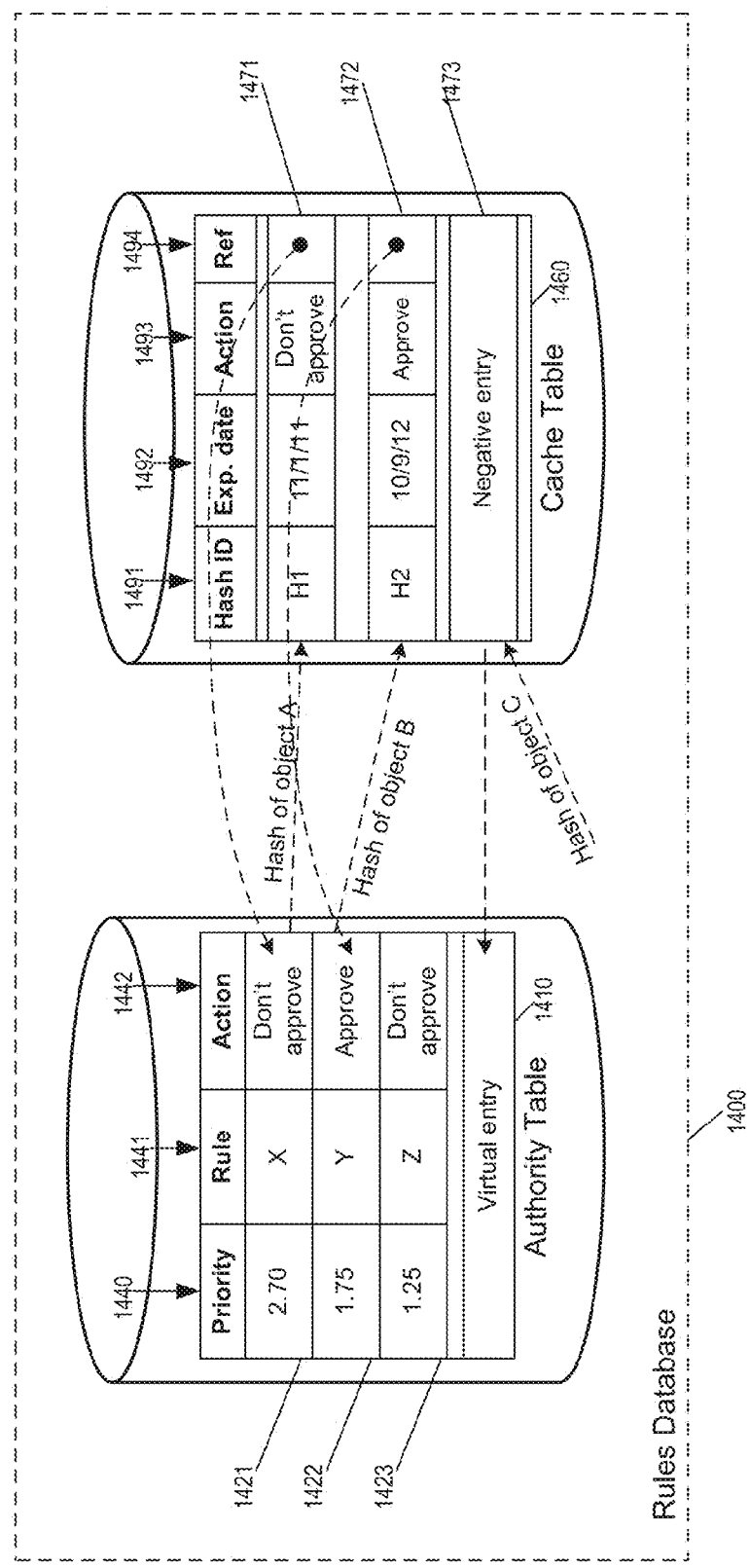
FIG. 14 illustrates a rules database that includes an authority table and a cache table.

For some embodiments, FIG. 14 illustrates a rules database 1400 that includes an authority table 1410 and a cache table 1460. The figure also illustrates example entries of the cache table and the relationships between the cache table entries and the authority table entries. In some embodiments, the authority table and the cache table are stored in separate physical storages, while in other embodiments, the authority table and the cache table are stored in a single physical storage.

The authority table 1410 has the same format and content as the authority table 900 of FIG. 9, including record entries 1421-1423, a priority field 1440, a rule field 1441, and an action field 1442.

The cache table 1460 includes three entries 1471-1473. Unlike the entries of the authority table, the entries of the cache table do not include a rule field. However, the cache table includes other fields, including a hash ID field 1491, an expiration date field 1492, an action field 1493, and a reference field 1494.

The entry 1471 of the cache table 1460 is based on a data object (data object A) that matches the entry 1421 of the authority table 1410. The entry 1472 of the cache table 1460 is based on another data object (data object B) that matches the entry 1422 of the authority table 1410. In some embodiments, these cache table entries are made when security assessment requests are made based on data objects A and B. The entry 1473 is based on a data object (data object C) that does not match any entry in the authority table 1410. The negative entry 1473 is made in the cache table 1460 when the authority table 1410 fails to yield a matching rule for a security assessment request that involves data object C. Therefore the existence of such a negative entry in the cache table prevents a long, exhaustive search of the authority table 1410.

The negative entry 1473 of the cache table does not inherit any fields from the authority table because it is generated from an object without a matching entry in the authority table 1410. In some embodiments, the negative entry includes an indication that this is a negative entry and that there is no matching entry in the authority table 1410 for the data object. In some such embodiments, the authority table contains "virtual" entries that are not normally processed but serve as anchors for negative entries in the cache table to refer back. In other words, cache records that are created as the result of determining that no rules apply (i.e., negative entries) would refer to a virtual "no authority" rule stored in the authority table (i.e., virtual entries). This is primarily done to ensure consistency in the data structures and does not affect the visible behavior of these embodiments.

The action field 1493 in a cache table entry records the action that was actually taken for a data object. This action is based on the application of the matching rules stored in the authority table 1410, approving or not approving the data object. For example, the action field of the cache table entry 1472 indicates "don't approve" for object B. This indicates that the matching rule for object B (stored in authority table entry 1422) assesses object B as failing to meet its code requirement and that object B was disapproved. A retrieval of this entry in the cache table by the next request based on object B would then also be disapproved. In other words, the action field 1493 of each cache table entry stores the security assessment of the data object of that entry.

The expiration date field 1492 indicates when a cache entry has expired. In some embodiments, the expiration date of a cache table entry for a data object is determined by the content of the data object. Some embodiments use the expiration date of the data object's certificate as the expiration date in the cache entry. For data objects whose signature is derived from a chain of certificates, the expiration date of the certificate that expires the earliest will be used in some of these embodiments. In some embodiments, the expiration date is determined by the rules in the authority table and inserted into cache table when a cache table entry is created. In some embodiments, the operating system specifies the expiration date on its own based on information other than the certificates of the data objects. Such information in some embodiments can be a default value supplied by vendors, the type of the requested operation, or any other information available to the operating system.

In some embodiments, a security assessor checks the expiration date field of a cache table entry before applying the entry. A cache table entry that has expired according to the expiration date will be ignored (and treated as a cache-miss) by the security assessor. This prevents the security assessor from making an incorrect security assessment based on obsolete entries in the cache table 1460. In some embodiments, an expired cache table entry is purged when it is accessed. Some embodiments include a purging mechanism that periodically checks the cache table for expired entries and remove them from the table.

The hash ID field 1491 stores a hash value. In some embodiments, the hash ID field of a cache table entry stores a value that is associated with a hash of the data object of the cache table entry. Some other embodiments do not include this field in the cache table.

In some embodiments the reference field 1494 stores a link back to the entry in the authority table. Specifically, the reference field 1494 of each cache table entry stores a link back to the authority table entry that is used to generate cache table entry (i.e., the rules of the authority table entry is used to perform security assessment of the data object associated with the cache table entry). For example, the reference field of the cache table entry 1471 would indicate that the cache table entry 1471 it is generated from the authority table entry 1421, and that the reference field of the cache table entry 1472 would indicate that the cache table entry 1472 is generated from the authority table entry 1422.

Some embodiments use the reference field in the cache table to purge cache table of entries that have become obsolete due to changes in the authority table. In some embodiments, the cache table also includes a priority field that is inherited from the authority table (not illustrated). Some embodiments use the priority field in the cache table to purge cache table of entries that have become obsolete due to changes in the authority table. The purging of cache table entries will be further described below in Section II-C and by reference to FIG. 18.

In some embodiments, the cache table 1460 includes other fields. The content of some of these cache table fields are inherited from the authority table entry that is used to create the cache table entry. In some embodiments, the entries in the cache table are not necessarily contiguous, as their addresses are determined by hash values of the data objects that are used to produce those entries. In some embodiments, the hash value for a data object is produced by performing a hash operation on the data object. In some embodiments, the hashing operation produces a hash value that uniquely identifies the data object from any other data object. In some embodiments, the hashing operation includes an incremental hashing operation. Descriptions of incremental hashing operation can be found in e.g., U.S. Pat. No. 7,103,779, which is hereby incorporated by reference.

In some embodiments, the hashing operation includes a code directory hashing operation. Code directory hash is a unique value in some embodiments that refers to every unique entry in the cache table. Therefore each data object with its corresponding code requirement is uniquely identified in the cache table, by a unique code directory hash. Descriptions of hash of code directory and its functions can be found in U.S. Patent Publication 2008/0168553, which is hereby incorporated by reference.

In the example of FIG. 14, the entry for object A (1471) is stored at a location that is indexed by a hash value of the object A, the entry for object B (1472) is stored at a location that is indexed by a hash value of the object B, and the entry for object C (1473) is stored at a location that is indexed by a hash value of the object C.

Figure 15:
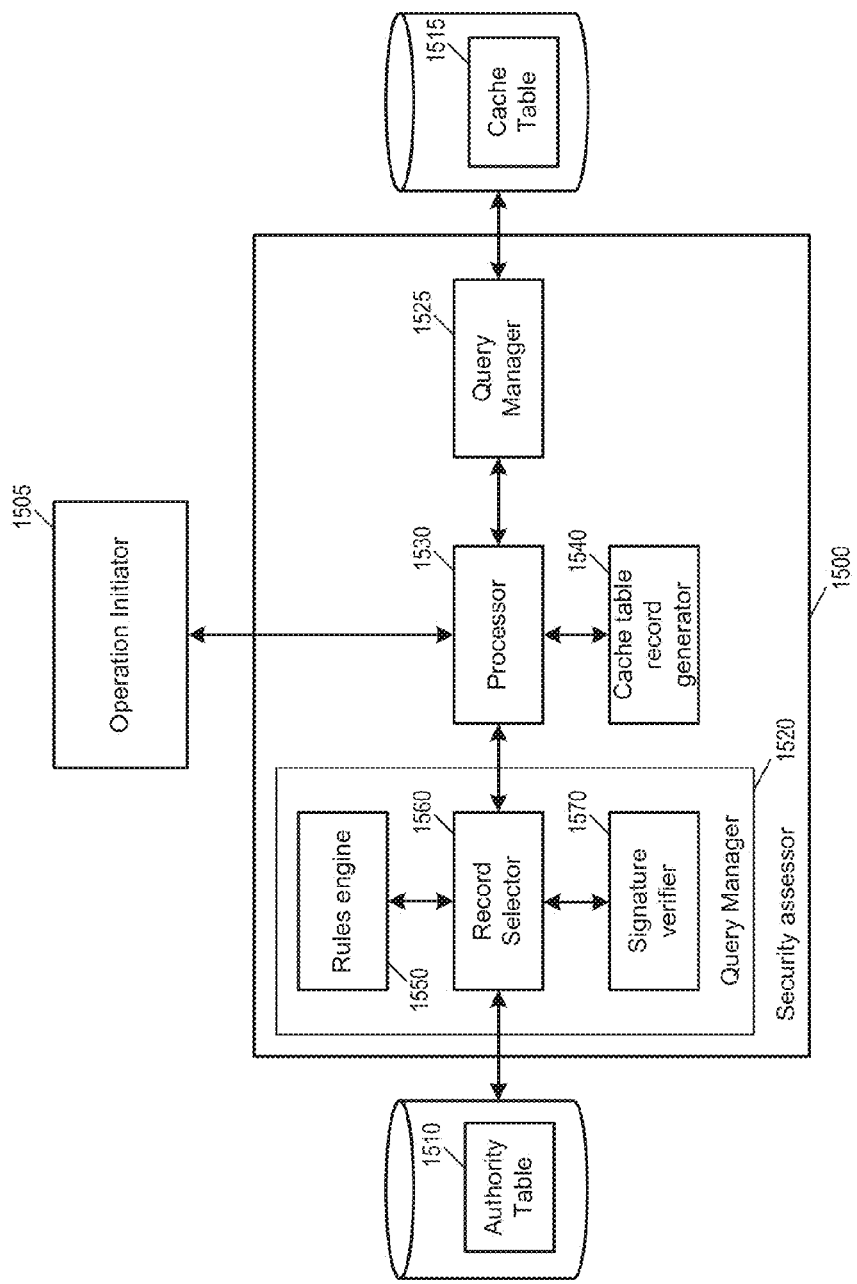
FIG. 15 illustrates a security assessor that uses both the authority table and the cache table for making a security assessment based on a request from an operation initiator.

For some embodiments, FIG. 15 illustrates a security assessor 1500 that uses both the authority table and the cache table for making a security assessment based on a request from an operation initiator. As illustrated, the security assessor 1500 receives a request from an operation initiator 1505 and queries both an authority table 1510 and a cache table 1515. The security assessor 1500 includes a query manager 1520 for querying the authority table and a query manager 1525 for querying the cache table. The security assessor 1500 also includes a processor 1530 and a cache table record generator 1540. The query manager 1520 for querying the authority table 1510 also includes a rules engine 1550, a record selector 1560, and a signature verifier 1570.

The operation initiator 1505 makes security assessment requests and waits for the results of the security assessments to come from the processor 1530 of the security assessor. The processor 1530 receives the security assessment requests from the operation initiator 1505. Based on this received security assessment request, the processor communicates with both query managers 1520 (for authority table) and 1525 (for cache table) in order to determine whether to approve the security assessment request. It also uses the cache table record generator 1540 to generate new cache entries when there is a cache-miss in the cache table 1515. The cache table record generator is also used to generate an address to the physical memory of the cache table 1515 by hashing data objects that are the subject of the request (i.e., program codes or documents.)

The query manger 1525 for querying the cache table provides an interface between the processor 1530 and the physical memory that contains the cache table 1515. The query manager 1520 for querying the authority table provides an interface between the processor 1530 and the physical memory that contains the authority table 1510. The query manager 1520 also uses the record selector 1560 to select and retrieve an entry from the authority table 1510. The retrieved entry is then relayed to the rules engine 1550 to be parsed and executed. In some embodiments, the query manager 1520 uses the signature verifier 1570 to verify the code signature of the data object. In such some embodiments, if the code signature fails to authenticate properly for any reason, the security assessor 1500 returns a disapproval message to the operation initiator 1505. In some embodiments, the functionalities of the rules engine 1550, the record selector 1560, and the signature verifier 1570 are performed by the processor 1530 instead of the query manager 1520.

The signature verifier module 1570 authenticates the code signature of the data object. In some embodiments, the signature verifier module authenticates the signature by using the information in a public key certificate as well as the content of the data object itself. The signature verifier module performs the signature authentication operation according to a signature authentication algorithm that is identified by the certificate. Upon the completion of the signature authentication process, the signature verifier module informs the security assessor 1500 whether the signature of the data object was successfully authenticated.

Figure 16:
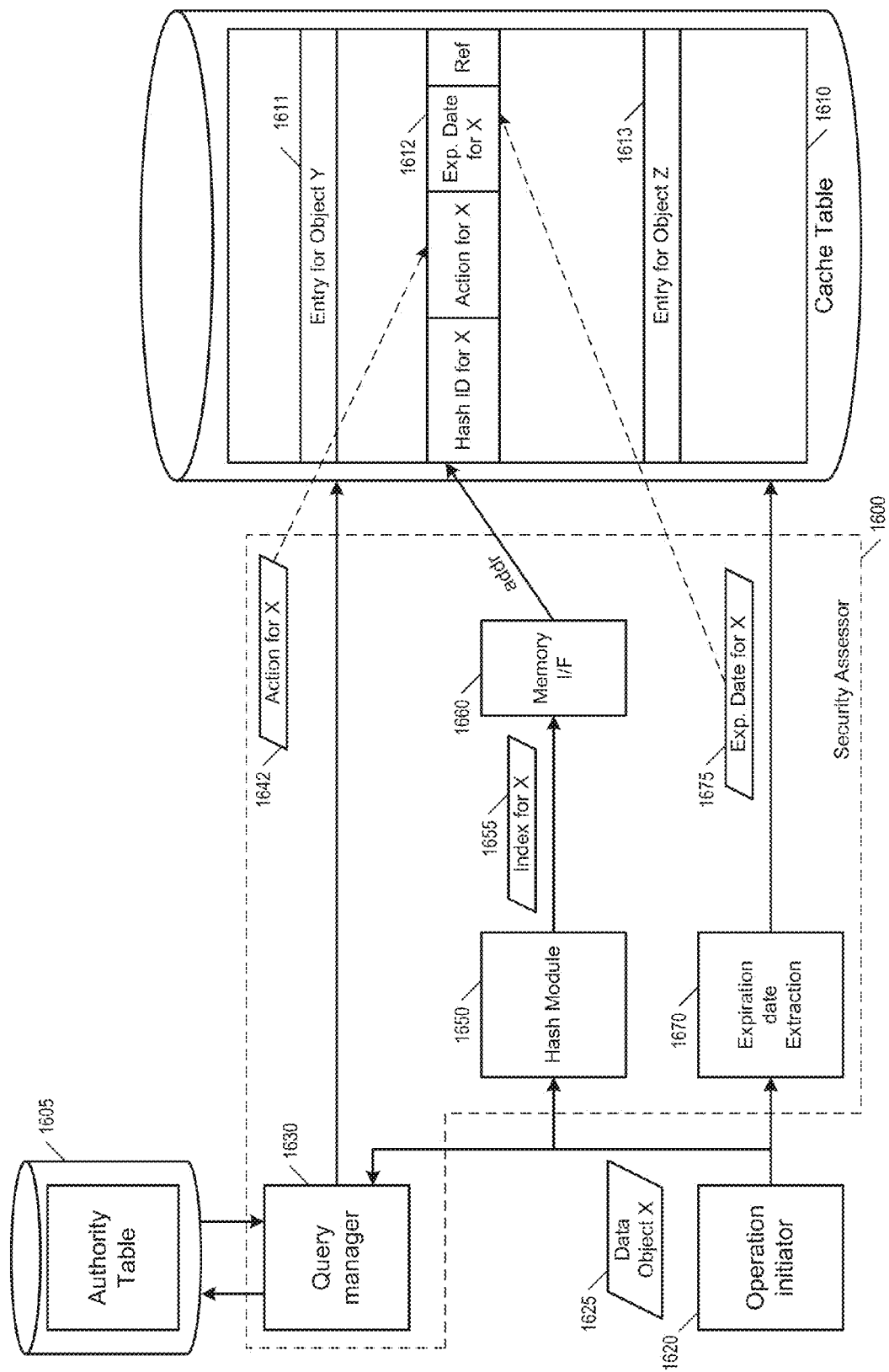
FIG. 16 illustrates generating and storing a cache table entry for a data object by a security assessor.

FIG. 16 illustrates generating and storing a cache table entry for a data object by a security assessor 1600. Specifically, the figure illustrates the generation of different fields in a cache table entry when a request is made to the security assessor based on the data object. FIG. 16 illustrates an authority table 1605, a cache table 1610, and an operation initiator 1620 that makes a request to the security assessor 1600 for the data object 1625. The cache table includes entries 1611-1613.

The security assessor 1600 includes a query manager 1630 for the authority table, a hash module 1650, a memory interface 1660, and an expiration date extraction module 1670. For some embodiments, the query manager 1630 is similar to the query manager 1520 in FIG. 15, while the functions of the hash module 1650, and the expiration date extraction module 1670 are performed by a processor similar to the processor 1530 of FIG. 15. Security assessor 1600 also includes other modules such as a signature verifier module which are not shown for the purpose of simplification of the figure.

The operation initiator 1620 makes a request to the security assessor 1600 for a security assessment regarding an operation that requires the use of a data object 1625 ('data object X'). The data object 1625 is relayed to several modules in the security assessor 1600, including the query manager 1630, the hash module 1650, and the expiration date extraction module 1670. The query manager 1630 finds an entry from the authority table 1605 that matches the data object 1625. The query manager then applies the rules of the matching entry to determine the appropriate action for the data object 1625. This action taken by the query manager forms the action field 1642 for a new cache table entry 1612.

The hash module 1650 receives the data object 1625 and performs a hash operation on the received data object. In some embodiments, the hash operation is an incremental hashing operation. The hash module 1650 produces a unique code directory hash value 1655 that serves as index ('index for X') for specifying a location in the cache table for the newly created cache table entry for the data object X. The memory interface 1660 then uses this value as a physical address for the cache table. In some embodiments, this uniquely generated code directory hash value will be stored in the Hash ID field of the entry 1612 for data object X.

The expiration date extraction module 1670, which also receives the data object 1625, computes or extracts the expiration date from the data object 1625. In some embodiments, the expiration date of a data object is specified by the certificate that is used to generate the signature of the data object. A data object may have its signature derived from more than one certificate or even a chain of certificates. For such a data object, some embodiments use the earliest expiration date among these certificates as the expiration for the cache table entry. The extracted expiration date becomes the expiration date field 1675. In some embodiments, the expiration date extraction module 1670 uses other information as the basis for determining expiration dates. In some other embodiments, the expiration date field 1675 is inherited from the authority table and not computed by the expiration date extraction module 1670.

The action field 1642, and the expiration date field 1675 are concatenated together to form a new cache table entry 1612 for the data object X, along with a hash ID field and a reference field for the data object X. The cache table 1610 has two other entries for two other objects (entry 1611 for data object Y and entry 1613 for object Z).

In some embodiments, the contents of a cache table can be shared across different computers running similar operating systems. A computer can import a cache table that is generated by another computer, or a pre-packaged cache table that is supplied by the vendor of the operating system. A computer using such a pre-filled cache table can immediately accelerate its security assessment operations without having to generate its own cache entries.

Figure 17:
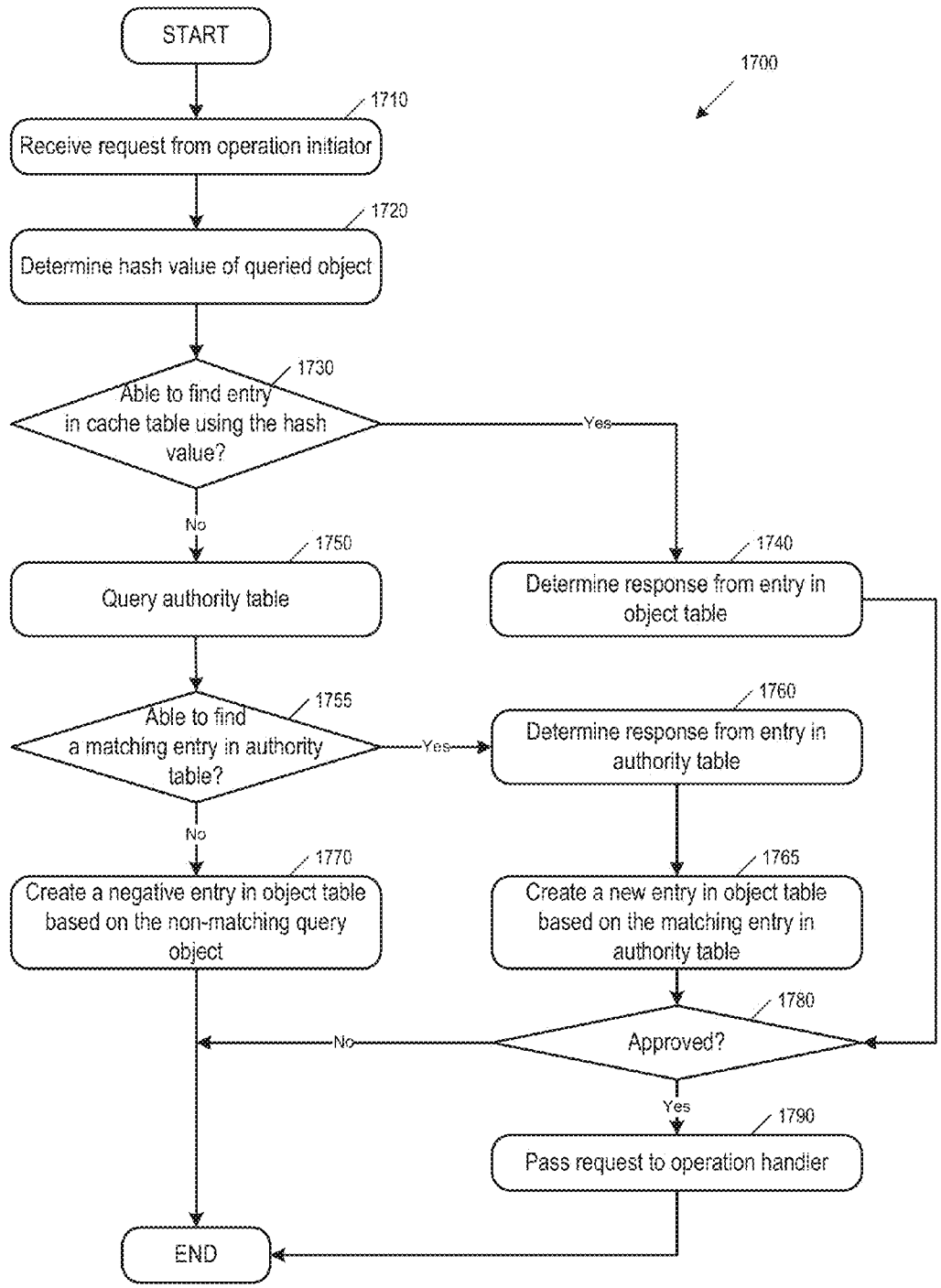
FIG. 17 conceptually illustrates a process that uses both an authority table and a cache table for performing a security assessment.

For some embodiments, FIG. 17 conceptually illustrates a process 1700 that uses both the authority table and the cache table for performing a security assessment. The process first attempts to find a matching entry in the cache table. If the process is not able to find such an entry in the cache table (i.e., cache miss), it will query the authority table to find a matching entry instead. The querying of the authority table results in a new entry in the cache table. This process is performed by the security assessor of the operating system in some embodiments.

The process 1700 starts when a request for an operation (e.g., executing an application, installing an application, or opening a document) is made by the operation initiator. The process receives (at 1710) this request along with the data object that is needed by the requested operation.

The process next determines (at 1720) a hash value for the data object (i.e., the unique code directory hash value). The hash value is computed in some embodiments by an incremental hashing operation. The computed hash value acts as an index for locating the entry in the cache table for the data object. Next, the process determines (at 1730) whether it is able to find a cache table entry by using the hash value. This determination, in some embodiments, is based on whether there is a valid entry stored at the location pointed to by the hash value. In some of these embodiments, each cache table entry is associated with a bit that indicates whether the cache table entry is valid or not. A cache table entry is not valid if it has not been filled by a cache entry for a data object, or if the cache table entry has been purged and not yet filled with a new cache entry. If the process is able to find a valid entry using the hash value of the data object (cache hit), the process proceeds to 1740. Otherwise (cache miss), the process proceeds to 1750.

At 1740, the process determines the response to the security assessment request based on the content of the matching cache table entry. The process then determines (at 1780) whether the response is an approval of the requested operation. If the response approves the operation, the process proceeds to 1790, in which the operation initiator passes the request to an operation handler, such as the execution module 172, the installation module 170, or the content opening module 174 of FIG. 1. If the response does not approve the operation, the operation initiator stops the operation from proceeding by not passing the request to the operation handler. After responding to the operation initiator based on the contents of the cache table entry, the process 1700 ends.

At 1750, the process queries the authority table because of the cache-miss at the cache table. In some embodiments, this operation is performed by the process 1300 of FIG. 13, which searches the authority table for an entry that matches the request.

Next, the process determines (at 1755) whether it was able to find a matching entry in the authority table. If so, the process proceeds to 1760. Otherwise, the process proceeds to 1770 to create a negative cache entry for the data object and then ends. The negative cache entry for the data object, as discussed above, enables the security assessor to quickly ascertain that the security policies of the operating system do not have rules that are applicable to the particular request.

At 1760, the process determines a response from the matching entry of the authority table. The process next creates (at 1765) a new entry in the cache table based on this matching entry from the authority table. The process then proceeds to 1780 to determine whether to approve or disapprove the requested operation. After responding to the operation initiator based on the contents of the authority table entry, the process 1700 ends.

C. User Override

In some embodiments, users with sufficient privileges are allowed to make changes to the rules database by adding, deleting, or modifying entries in the authority table. For example, a user with administrator privilege may bypass signature authentication for executing a particular application. The user can do so by adding a higher priority entry into the authority table that supersedes lower priority rules, and thereby allowing the particular application to be executed.

However, as shown in FIG. 10 above, a security policy often includes a number of table entries that are linked together by priorities. Therefore, assessing a data object under a security policy requires examining these table entries in the order set forth by their priorities. For any given security assessment for a data object, lower priority rules become applicable only when higher priority rules are not applicable. Hence any change to a higher priority rule potentially changes the applicability of lower priority rules.

Since the cache table stores cache entries that reflect the applicability of the rules prior to the change in the authority table, in some embodiments, a change in the authority table of a particular priority triggers the purging of all equal or lower priority entries in the cache table. For example, a new authority table entry with priority value 2.3 would trigger the purging of all cache table entries with priorities values equal to or lower than 2.3. In some embodiments, this purging process uses the reference field (e.g., 1494 of FIG. 14) in each of the cache table entries to learn the priority of the authority table entry that is used to create the cache table entry. In some other embodiments, each cache table entry carries a priority field that is inherited from the authority table for this purpose.

In some embodiments, a negative cache entry is assumed to have the lowest priority. Since a negative entry is the cache table entry of a data object that does not have a matching entry in the authority table, any change in the authority table may affect the data object of the negative entry (i.e., the change in the authority potentially causes the data object to have a matching entry in the authority table, thus making the negative entry obsolete.) In some of these embodiments, any change to the authority table always causes negative cache entries to be purged.

Figure 18:
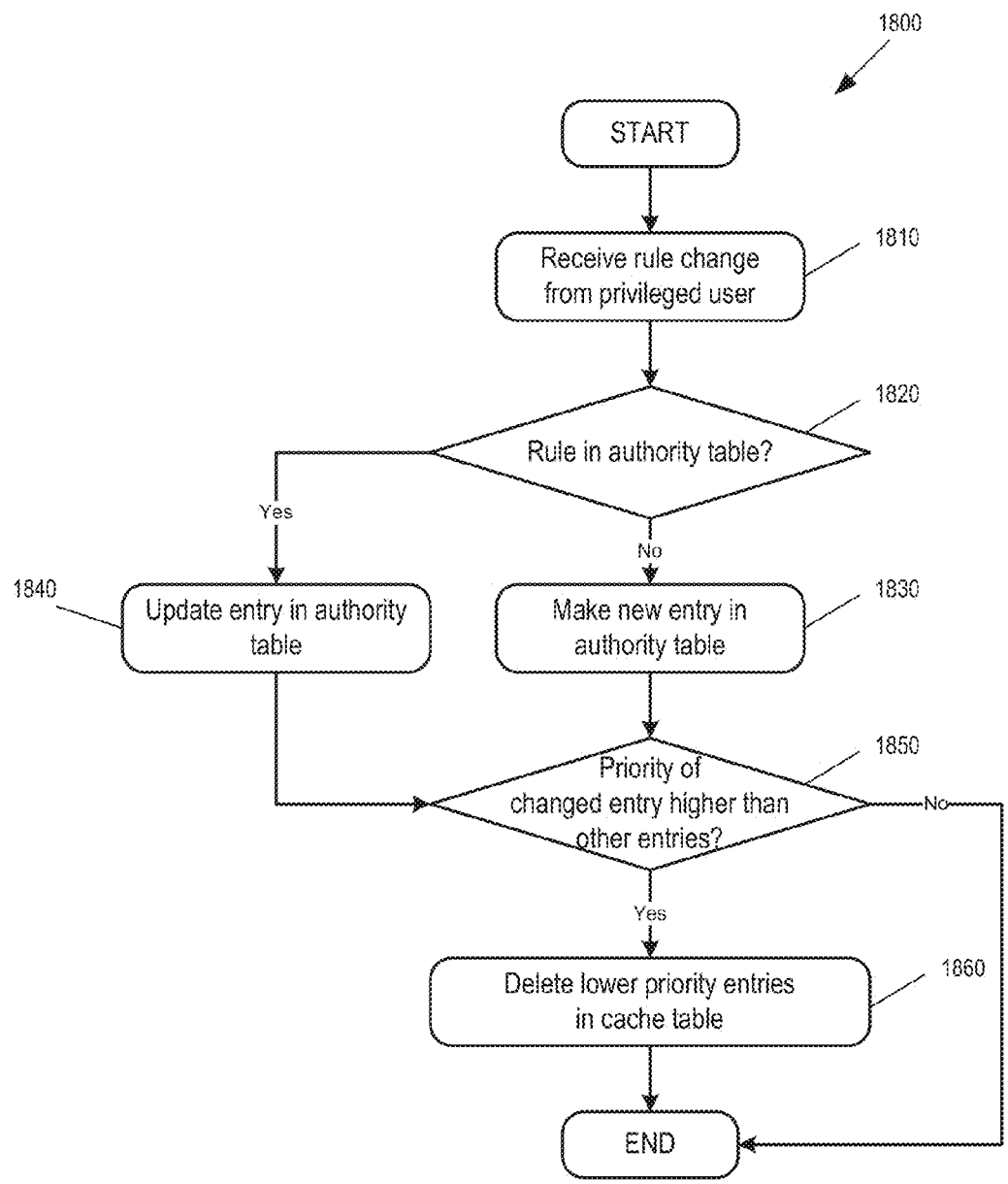
FIG. 18 conceptually illustrates a process that maintains the rules table following a change in the rules database by the user.

For some embodiments, FIG. 18 conceptually illustrates a process that maintains the rules table following a change in the rules database by an administrative user. The process purges the lower priority entries from the cache table. The process 1800 starts when a privileged user (e.g., administrator) makes a change to the rules database. The process receives (at 1810) the rule change from the privileged user and determines (at 1820) whether the rule change is to a rule that is already in the authority table. If the rule change is to a rule that is already in an authority table entry, the process proceeds to 1840 to update the authority table entry. If not, the process proceeds to 1830 to make a new entry in the authority table.

The process next determines (at 1850) whether there are entries in the rules database with lower priority than the newly added or updated rule. If so, the process proceeds to 1860. Otherwise, the process 1800 ends.

At 1860, the process deletes all lower priority entries in the cache table. In some embodiments, the process examines all occupied entries in the cache table and purges entries with priorities lower than or equal to the newly added or updated authority table entry. After deleting all lower priority cache table entries (including any negative entries), the process 1800 ends.

III. Security Assessment of Downloaded Content

Some of the embodiments described above use certificates that are embedded in data objects for making a security assessment about these data objects. In most instances, these methods rely on identifiers that are provided by the source of these data objects (e.g., signatures and vendor IDs in certificates). However, these source-provided identifiers are not always available or reliable. Thus, in addition to, or instead of, relying on these source-provided identifiers for performing the security assessment, the operating system of some embodiments provides its own identifier for the data objects. In some of these embodiments, the operating system associates a tag with data objects that are imported from external sources such as the Internet, a USB flash drive, or through any other peripheral interface of the device. The tag includes a quarantine bit to indicate that the data object is from an external source. The presence of the quarantine bit further indicates that the system has not performed security assessment on the data object. Once the operating system has performed security assessment on the data object, the tag is updated (e.g., by removing the quarantine bit) to indicate that the data object has already been assessed under the security policy of the operating system, and that the data object has passed (or failed) the security policy of the operating system.

Figure 19:
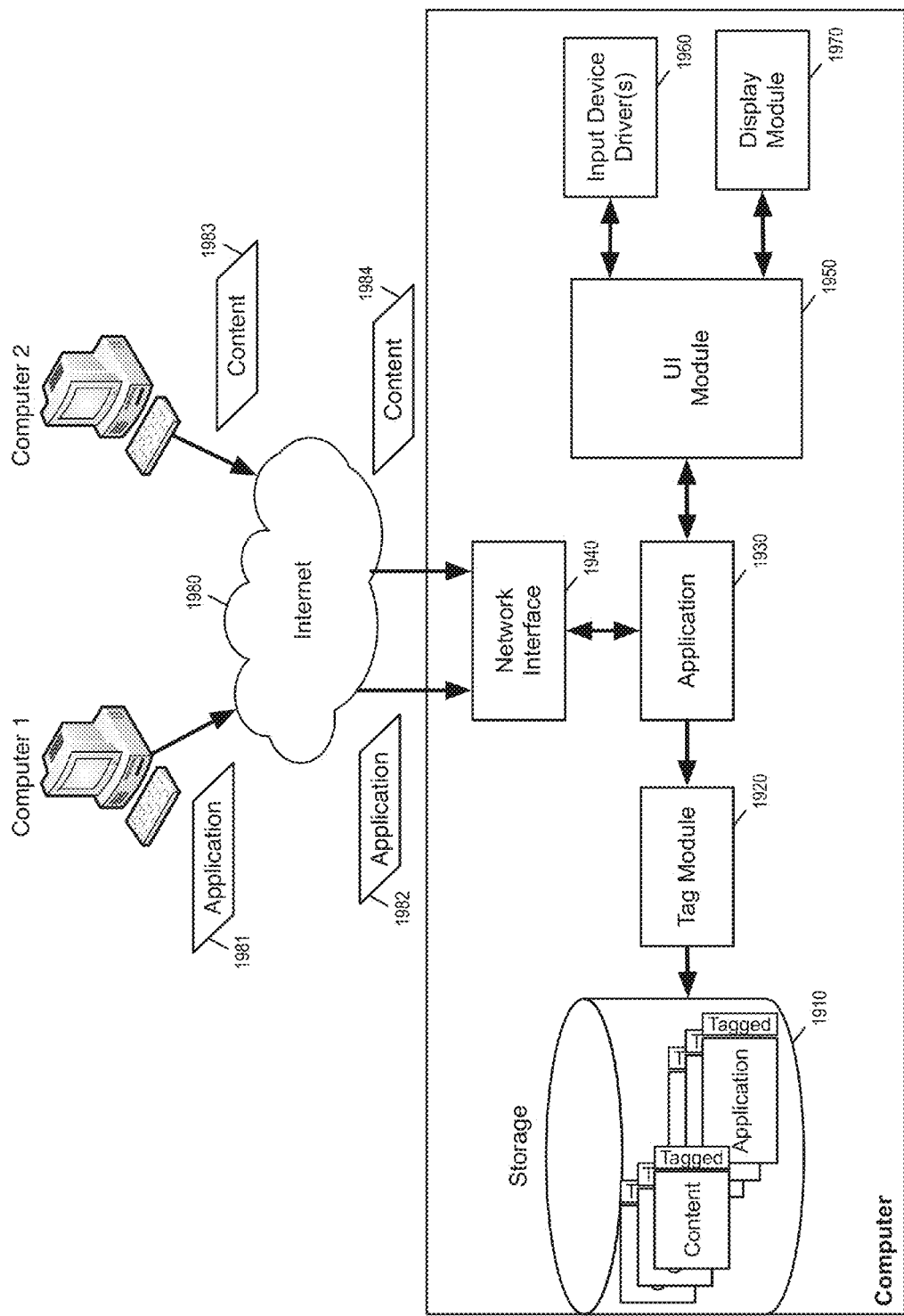
FIG. 19 illustrates a computer with an operating system that inserts its own identifier for performing security assessment.

FIG. 19 illustrates a computer 1900 with an operating system that uses its own identifier for performing security assessment. Specifically, the operating system of the computer 1900 adds a tag or quarantine bit to content and/or applications that are, for example, downloaded from the Internet. The computer 1900 includes a storage device 1910, a tag module 1920, an application 1930 that is currently running on the computer 1900, a network interface 1940, and a user interface (UI) module 1950. The UI module 1950 controls communication with the user through input device drivers 1960 and a display module 1970.

The network interface 1940 provides the communication interface between the computer 1900 and the outside world via a network. The network allows the computer 1900 to communicate over the Internet 1980 and access data objects such as application files 1981-1982 and content files 1983-1984 from other computers. These content files can be text files, word processor documents, spreadsheets, media files, etc. Application files can include installation and program files. These application and content files can then be downloaded onto the computer 1900. Though not shown in the figure, the computer 1900 can also download data objects from external sources other than the Internet (such as an external flash drive).

The application 1930 is a program or a set of processes that are currently running on the computer 1900 via the operating system. The application 1930 can be an Internet browser, a word processor, a video game, a media editing application or any program that can operate on the computer 1900. The application 1930 can perform operations that require communication over the Internet, including downloading data objects 1981-1984 from sources over the Internet via the network interface. Once the files have been downloaded, the application 1930 stores the downloaded files in the storage device 1910. In some embodiments, the downloaded files must go through tag module 1920 before being stored.

The tag module 1920 associates each downloaded file with a tag. In some embodiments, such a tag includes a quarantine bit to indicate that the downloaded file is from an external source and has not been examined under the security policy of the operating system. In some embodiments, the tag module inserts or appends the tag onto the downloaded file. In some embodiments, the tag module maintains a tag table that records which files are from the Internet or other external sources. Other processes or modules running on the computer can access the tag table to find out which files or data objects are tagged as being from the external sources such as the Internet. Some embodiments associate a tag with a file from the external source as soon as it is downloaded by the application 1930 and before the file is stored in the storage device 1910.

The storage device 1910 stores various data objects for the computer 1900. These data objects can include content files and application files that are downloaded from Internet or other external sources. In some embodiments, these downloaded applications and content files are associated with tags that are supplied by the tag module 1920.

Figure 20:
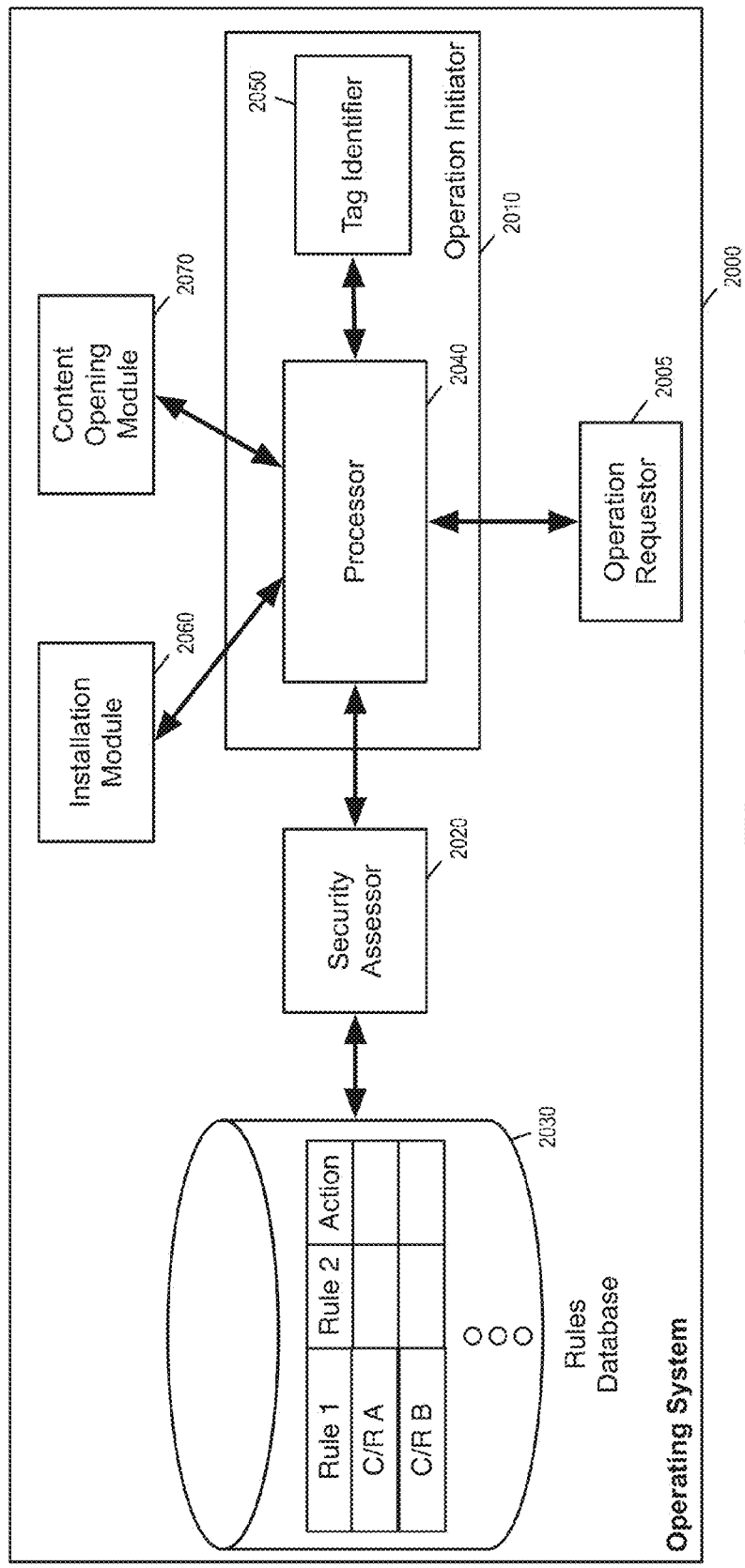
FIG. 20 illustrates an operating system that checks the tag as part of a security assessment operation.

Once downloaded files are stored and tagged, the operating system can perform a security assessment based on security policies that consider whether a data object is downloaded or not. FIG. 20 illustrates an operating system 2000 whose security policy requires checking for presence of tags or quarantine bits. Specifically, the operating system 2000 includes a mechanism for identifying whether a data object is tagged or not before performing security assessment operations. The security assessment operations are similar to those described in Sections I and II above.

As illustrated, the operating system 2000 includes an operation requestor 2005, a security assessor 2020, a rules database 2030, and an operation initiator 2010. The operation initiator includes a processor 2040 and a tag identifier module 2050. The operating system also includes an installation module 2060 and a content opening module 2070.

In some embodiments, the operating system 2000 is similar to the operating system 100 of FIG. 1. Specifically, the operation requestor 2005, like the operation requestor 140, makes requests for performance of operations to the operation initiator 130. Like the installation module 170 and the content opening module 174, the installation module 2060 and the content opening module 2070 are the operation handlers that receive the approved requests and perform the approved operation.

The security assessor 2020 and the rules database 2030 perform similar operations as the security assessor 110 and the rules database 120 illustrated in FIG. 1. The functions of the security assessor and the rules database are also described above in Section II by reference to FIGS. 7-17. For example, the rules database 2030 includes both an authority table and a cache table in some embodiments. In some embodiments, the security assessor 2020 performs security assessment of the tagged object based on user input. For example, upon receiving a request for security assessment for a tagged object, the security assessor 2020 informs the user that the requested operation involves a downloaded object and asks the user whether to proceed knowing the risks.

The operation initiator 2010, like the operation initiator 130, enforces the security policy of the operating system by allowing or disallowing a particular operation to take place. It receives a request for the particular operation from the operation requestor 2005 and requests the security assessor 2020 to assess the requested operation under the security policies of the operating system 2000. However, unlike the operation initiator 130 of FIG. 1, the operation initiator 2010 checks whether the data object for the requested operation is tagged as being from the Internet or any other external sources. Data objects that are tagged as being from an external source (e.g., tagged with a quarantine bit) are subject to security assessment. In order to avoid repeated security assessment on data objects that have already been assessed, some embodiments update the tag after the security assessment to indicate that the data object has already been previously assessed. Some embodiments accomplish this by removing the quarantine bit. In some embodiments, the updated tag also indicates whether the data object has passed or failed the previous security assessment.

In the example of FIG. 20, the tag identifier module 2050 inside the operation initiator 2010 checks the tag and reports to the processor module 2040. In the operating system 2000, the security assessor 2020 does not make its security assessment based on the tag. It is the processor 2040 within the operation initiator 2010 that uses the tag to decide whether to proceed with the requested operation. In some of these embodiments, the operation initiator 2010 proceeds with security assessment only if the data object associated with the requested operation is tagged as being from an external source and that it has never been assessed. If the data object is not tagged as such (e.g., if the quarantine bit has been removed, or if data object is already tagged as having been previously assessed), the operation initiator 2010 will not request the security assessor to perform security assessment.

Figure 21:
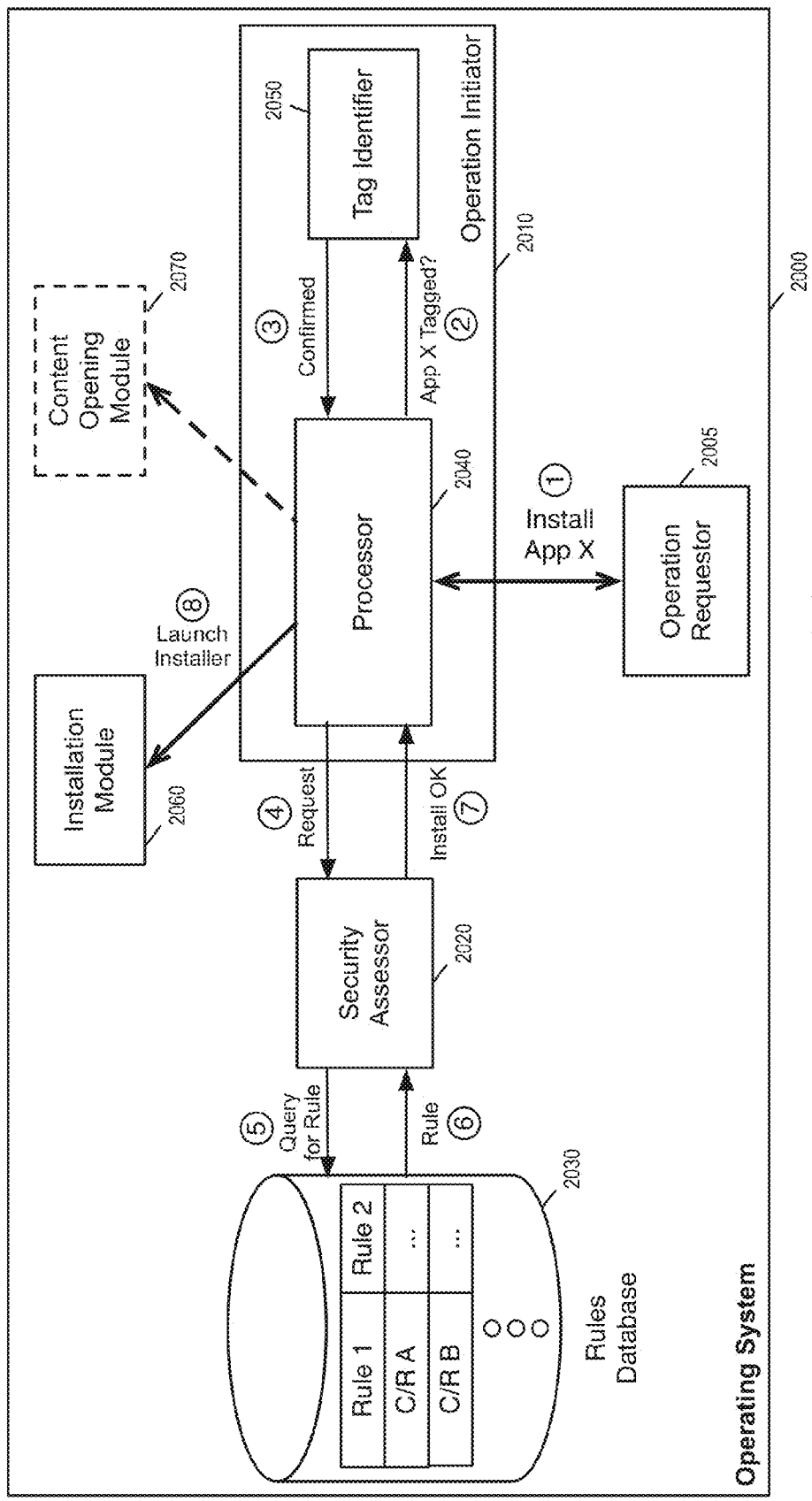
FIGS. 21-22 illustrate the flow of data in an operating system when performing a security assessment using an operation initiator that identifies tags in data objects.
Figure 22:
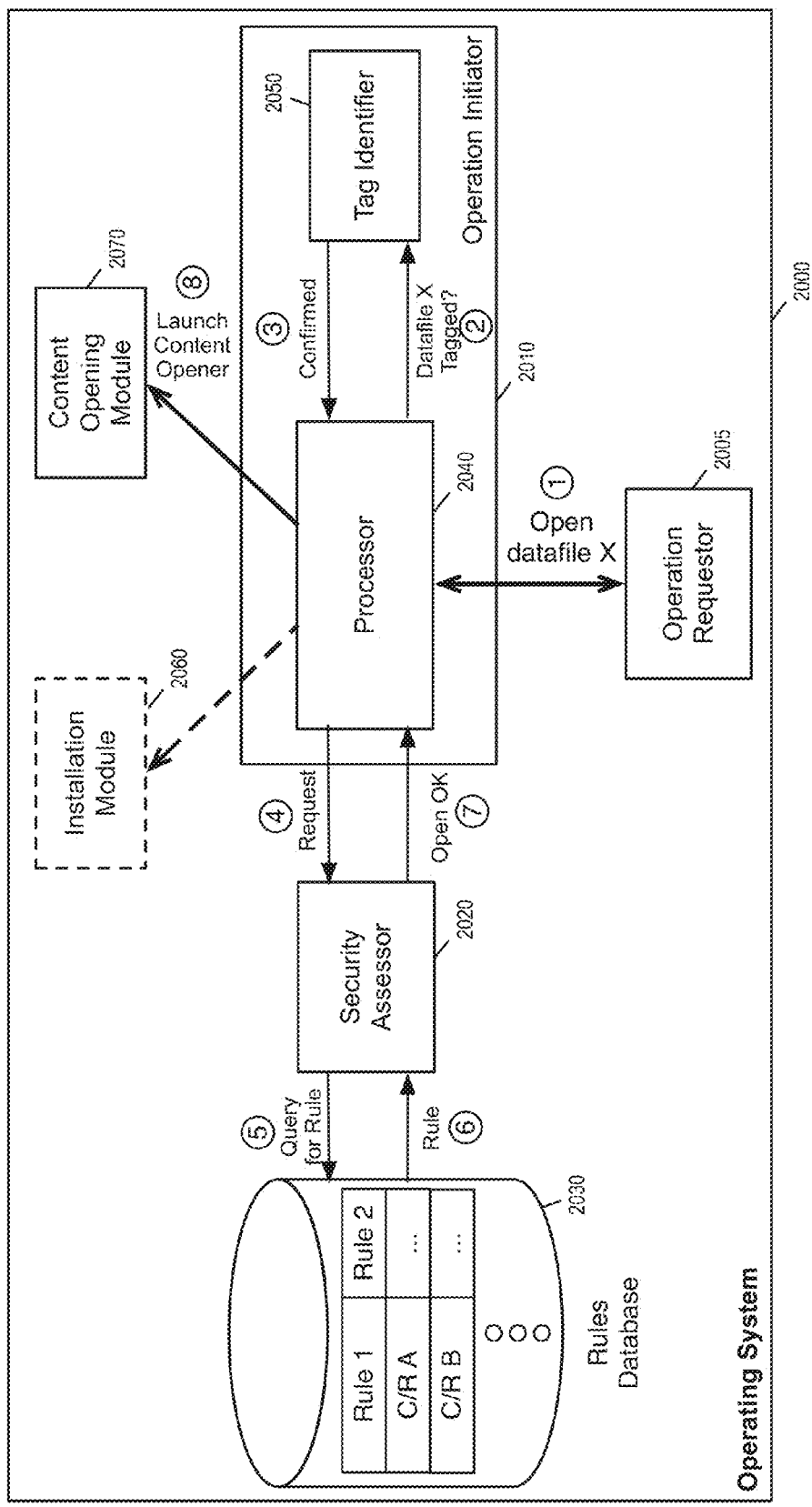

FIGS. 21-22 illustrate the flow of data in the operating system 2000 when performing a security assessment using an operation initiator that identifies tags in data objects. As in FIG. 20, the operating system 2000 in FIGS. 21-22 includes the security assessor 2020, the rules database 2030, the operation initiator 2010, the operation requestor 2005, the installation module 2060, and the content opening module 2070.

FIG. 21 illustrates the data flow of an operation that installs an application into the operating system 2000. The operation starts at the operation requestor 2005 when it makes a request for installing Application X (operation '1') to the operation initiator 2010. The processor 2040 then sends a command to the tag identifier module 2050 to ask whether Application X is tagged (operation '2'). If Application X is tagged as being from an external source (e.g., having a quarantine bit), the tag identifier 2050 sends the confirmation to the processor 2040 (operation '3'), and the processor in turn makes a request to the security assessor 2020 (operation '4') to perform security assessment. On the other hand, if Application X is not tagged, or if Application X is tagged as being previously assessed (or having its quarantine bit removed), the processor 2040 in some embodiments will not request the security assessor 2020 to perform security assessment. In some embodiments, if Application X is tagged as having failed previous security assessment, the processor 2040 can immediately end the installation process without involving the security assessor 2020. Conversely, if Application X is tagged as having passed previous security assessment, the processor 2040 in some embodiments can immediately allow Application X to proceed without involving the security assessor 2040.

If the request for security assessment has been made, the security assessor 2020 queries the rules database 2030 (operation '5'). The rules database 2030 provides (operation '6') the rules or instructions in its database to the security assessor 2020. This query process between the security assessor 2020 and the rules database 2030 continues until a matching rule is found in the rules database or until a determination is made that there is no applicable rule in the rules database.

Once a matching rule has been found, the security assessor 2020 applies the matching rule to the data objects related to the installation of Application X. The security assessment is then communicated back to the operation initiator 2010 (operation '7'). In the example of FIG. 21, the communication from the security assessor back to the operation initiator indicates that it is OK to install Application X, as data objects related to the installation of Application X has been found to comply with the security polices stored in the rules database.

Upon knowing that Application X has passed the security assessment performed by the security assessor 2020, the processor 2040 determines whether to proceed with the installation of Application X. In addition to the security assessment made by the security assessor, the processor 2040 in some embodiments considers whether Application X is tagged or not. If the processor decides that it is OK to proceed with the installation of Application X, it sends a command to the installation module 2060 to launch the installation of the Application X (operation '8'). The dashed lines around the content opening module 2070 indicate that it is not involved in this operation.

FIG. 22 illustrates a data flow diagram for an operation that opens a document in the operating system 2000. The operation starts at the operation requestor 2005 when it makes a request for opening data file X (operation '1') to the operation initiator 2010. The processor 2040 then sends a command to the tag identifier module 2050 to ask whether data file X is tagged (operation '2'). If data file X is tagged as being from an external source (e.g., having a quarantine bit), the tag identifier 2050 sends the confirmation to the processor 2040 (operation '3'), and the processor in turn makes a request to the security assessor 2020 (operation '4') to perform security assessment. On the other hand, if data file X is not tagged, or if data file X is tagged as being previously assessed, the processor 2040 in some embodiments will not request the security assessor 2020 to perform security assessment. In some embodiments, if data file X is tagged as having failed previous security assessment, the processor 2040 can immediately end the file opening process without involving the security assessor 2020. Conversely, if data file X is tagged as having passed previous security assessment, the processor 2040 in some embodiments can immediately allow opening of data file X to proceed without involving the security assessor 2040.

If the request for security assessment has been made, the security assessor 2020 then queries the rules database 2030 (operation '5'). The rules database 2030 provides (operation '6') the rules or instructions in its database to the security assessor 2020. This query process between the security assessor 2020 and the rules database 2030 continues until a matching rule is found in the rules database or until a determination is made that there is no applicable rule in the rules database.

Once a matching rule has been found, the security assessor 2020 applies the matching rules to the data objects related to the opening of data file X. The security assessment is then communicated back to the operation initiator 2010 (operation '7'). In the example of FIG. 22, the communication from the security assessor back to the operation initiator indicates that it is OK to open data file X, as data file X has been found to comply with the security polices stored in the rules database.

Upon knowing that data file X has passed the security assessment performed by the security assessor 2020, the processor 2040 determines whether to proceed with the opening of data file X. In addition to the security assessment made by the security assessor, the processor 2040 in some embodiments also considers whether data file X is tagged or not. If the processor decides that it is OK to proceed with the opening of data file X, it sends a command to the content opening module 2070 to launch the opening of data file X (operation '8'). The dashed lines around the installation module 2060 indicate that it is not involved in this operation.

FIGS. 20-22 illustrate an operating system 2000 having an operation initiator 2010 that decides whether a data object is tagged as being from an external source such as the Internet. The operation initiator 2010 of the operating system 2000 also makes the determination of whether to proceed with an operation based on the tag. The rules stored in the rules database do not consider or process the tag. In some other embodiments, however, the rules database of the operating system includes rules that identify the tag and make security assessments based on the identified tag.

Figure 23:
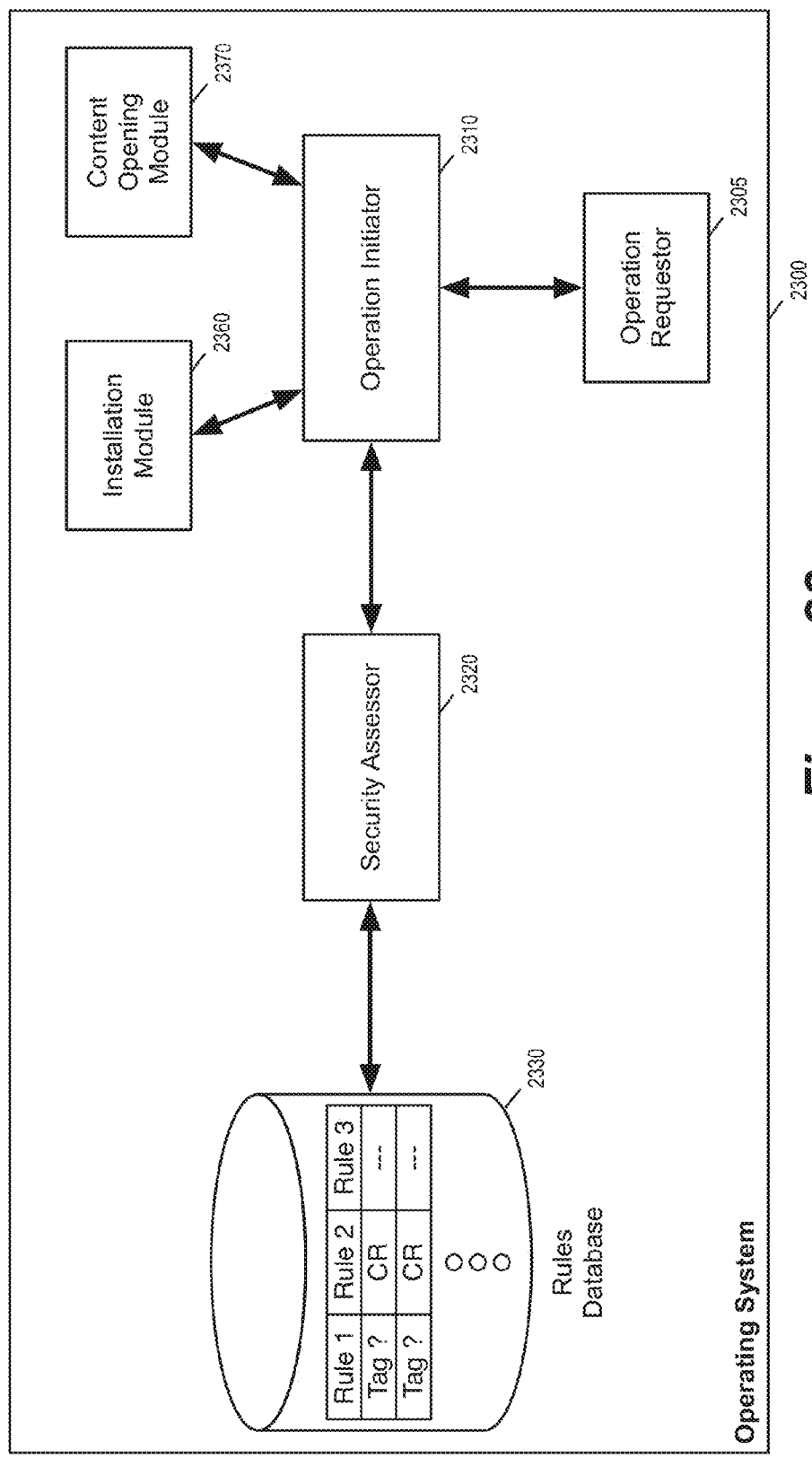
FIG. 23 illustrates an operating system that includes a rules database with rules for processing tag bits.

For some embodiments, FIG. 23 illustrates an operating system 2300 that includes a rules database with rules for processing tags associated with downloaded data objects. The operation initiator in some such embodiments does not check the tag of the data object that is associated with the requested operation. Like the operating system 2000, the operating system 2300 includes an operation requestor 2305, a security assessor 2320, a rules database 2330, and an operation initiator 2310. The operating system also includes an installation module 2360 and a content opening module 2370.

The operation initiator 2310 receives requests for operations from the operation requestor 2305 and makes requests for security assessments to the security assessor 2320. However, unlike the operation initiator 2010, the operation initiator 2310 does not perform checking of download tags.

The security assessor 2320 receives the requests for security assessments from the operation initiator 2310 and queries the rules database for rules that match the data object associated with each security assessment request.

The rules database 2330 stores the rules for performing the security assessment. Unlike the rules database 2030, the rules database 2330 also includes rules for analyzing data objects to see if they are tagged. If the data object is tagged, some embodiments then proceed to apply the rules in the rules database to perform security assessment on the data object and approve/disapprove the requested operation. In some embodiments, the rules database 2330 includes both an authority table and a cache table, as described earlier in Section II. For example, a data object that was disapproved by an earlier security assessment because of its quarantine bit can have a cache entry with an action field that disapproves the data object.

IV. Security Assessment of Documents

Since a signature for identifying the source of a data object is derived partly based on the content of the data object, signatures can be used to test whether the data object has been altered. This also means that a data object whose content is frequently changed by users (e.g., a document) cannot have its own signature. However, a data file can be placed in a structure (such as an archive) that is capable of carrying a certificate that includes a signature. Such a signature can be used to securely identify the source of the data files in the structure. In some embodiments, the operating system includes rules in the rule database that approve or disapprove documents or data files based on the identifiers in the certificates embedded in the archive structures. A document in an approved archive is considered by some of these embodiments to be approved as well.

Figure 24:
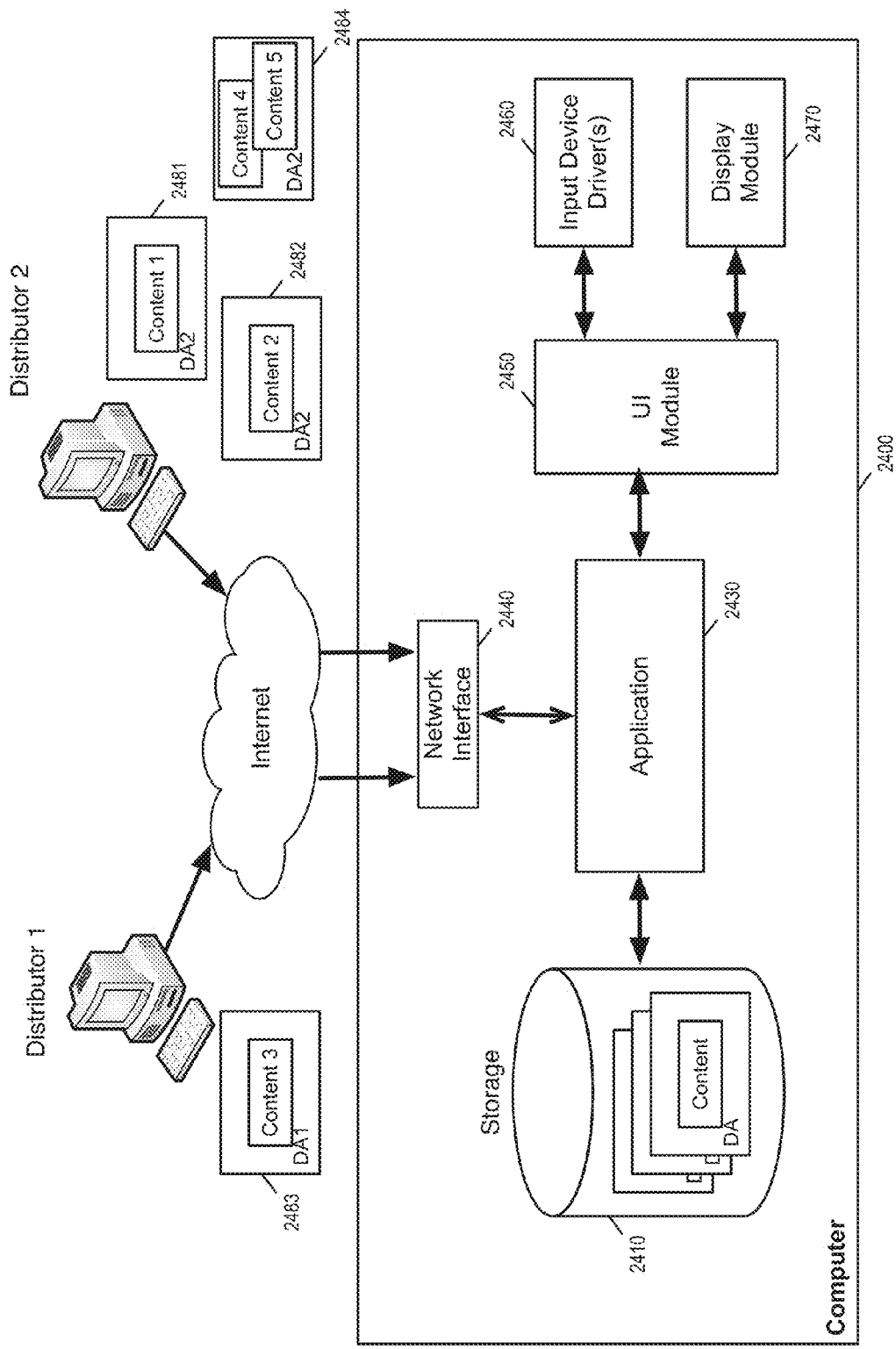
FIG. 24 illustrates a computer that receives and stores data archives that contain signatures.

FIG. 24 illustrates a computer 2400 that receives and stores data archives that have certificates. The certificates (with signatures) can then be used by the operating system of the computer 2400 to securely identify the source of the content within the archive. As illustrated, the computer 2400 includes a storage device 2410, an application 2430 that is currently running on the computer 2400, a network interface 2440, and a user interface (UI) module 2450. The UI module 2450 controls communication with the user through input device drivers 2460 and a display module 2470.

The network interface 2440 provides the communication interface between the computer 2400 and the outside world via a network. The network allows the computer 2400 to communicate over the Internet and access data objects such as data archives 2481-2484 from other computers. The content of these archives can be text files, word processor documents, spreadsheets, media files, etc. The content of these archives can also be executable applications or application installation files. Some or all of these data archives have certificates with signatures that identify their source. A data archive can contain one piece of content (such as data archive 2481) or multiple pieces of contents or files (such as data archive 2484). Though not shown in the figure, the computer 2400 can also access data archives from other computers through other means of data communication such as an external flash drive.

The application 2430 is a program or a set of processes that are currently running on the computer 2400 via the operating system. The application 2430 can be an Internet browser, a word processor, a video game, a media editing application or any programs that can operate in the computer 2400. The application 2430 can perform operations that require communication with the Internet, including downloading the data archives 2481-2484 from the Internet via the network interface 2440.

Once the data archives have been downloaded, the application 2430 stores the downloaded files in the storage device 2410. The storing operation of data archives into the storage device 2410 is similar to the storing operation of tagged or quarantined data as described earlier by reference to FIG. 19. The storage device 2410 stores the data archives. Once the data archives are stored, the operating system can perform security assessments by authenticating the signatures and examining the certificates embedded in the data archives.

FIG. 25 illustrates an operating system that includes rules in the rules database for making security assessments of data files or documents based on the certificates of data archives. Specifically, FIG. 25 illustrates an example request for opening a data file in the operating system 2500. The data file is embedded in a data archive.

The operating system 2500 includes an operation requestor 2505, a security assessor 2520, a rules database 2530, an operation initiator 2510 and a content opening module 2570. The operating system 2500 also has access to the storage device 2560, which stores several data archives, including the data archive 2580. In some embodiments, the storage device 2560 includes the storage 2410 of FIG. 24, which stores data archives downloaded from the Internet or other external sources.

In some embodiments, the operating system 2500 is similar to the operating system 100 of FIG. 1. Specifically, the operation requestor 2505, like the operation requestor 140, makes requests for performance of operations to the operation initiator 2510. The operation initiator 2510 receives the request from the operation requestor 2505 and makes a request for a security assessment to the security assessor 2520. In the example illustrated by FIG. 25, the request is for opening a document or data file that is embedded in the data archive 2580. The operation initiator 2510 makes the request to the security assessor 2520 by passing the data archive 2580 to the security assessor. Once the operation initiator 2510 receives the response from the security assessor 2520, it either launches the content opening module 2570 or terminates the requested operation based on the security assessment.

The security assessor 2520 and the rules database 2530 perform similar operations as the security assessor 110 and the rules database 120. In some embodiments, the rules database includes both an authority table and a cache table as described above in Section II by reference to FIGS. 7-17. In order to securely identify the source of data files or documents, the security assessor 2520 authenticates the signature before applying rules stored in the rules database 2530.

The content opening module 2570 is similar to the content opening module 174 of FIG. 1. Once it receives the launch command from the operation initiator 2510, the content opening module 2570 proceeds to open the requested data file. In the example of FIG. 25, the data file requested to be opened is in the data archive 2580, which is stored in the storage device 2560. To open the data file, the content opening module 2570 in some embodiments extracts the data file from the archive structure and then opens the data file (e.g., by sending the data file to an application that is needed to open the data file).

For some embodiments, FIG. 26 conceptually illustrates a process 2600 that performs security assessments of document opening operations. Specifically, the process 2600 is performed by an operating system for making the security assessment determination based on certificates with signatures embedded in data archives.

The process 2600 starts when it receives a request for opening a data file (or document). The process receives (at 2610) the document that is requested to be opened. The process then determines (at 2620) whether the document is of a safe type. In some embodiments, documents or files of types that are considered unlikely to harm a computer are permitted to be opened regardless of its source. For example, text files are considered safe and require no signature or other identifications of source. If the document is considered to be of a safe type, the process proceeds to 2670 to pass the document to an operation handler (such as the content opening module 2570 of FIG. 25) for opening the document. If the document is not considered to be of a safe type, the process proceeds to 2630. Documents that are executable are not considered safe in some embodiments. Non-executable documents of certain types also require source verification in some embodiments, since such non-executable documents are capable of carrying malicious code that may harm the computer through applications that open and use those documents.

Next, the process determines (at 2630) whether a document is in an archive. As mentioned above, some data files or documents do not have a source identifying signature, but data files can be placed in an archive structure that carries a signature. However, in some embodiments, documents of certain types can include signatures of their own without being in an archive (e.g., documents that are rarely changed can carry a signature that tests whether the file has been altered). If the document is in an archive, the process 2600 proceeds to 2650. Otherwise, the process proceeds to 2640 to perform a security assessment of the document by itself.

At 2640, the process performs security assessment based on the document's own certificate. The operation includes the authentication of the signature of the document that is embedded in the certificate of the document, as well as additional security assessments based on other information in the certificate. In some embodiments, the process queries the rules database for matching rules that can be used to make a security assessment on the document. This operation in some embodiments includes applying code requirements to the document. The code requirements can include instructions to examine certificates embedded in the document and to check if the source is trusted. After performing the security assessment, the process determines (at 2660) whether to approve the document for opening based on the matching rules. If so, the process passes (at 2670) the document to an operation handler (such as the content opening module 2570 of FIG. 25) for opening. Otherwise the process ends.

At 2650, the process performs security assessment based on the archive's certificate. The operation includes the authentication of the signature that is embedded in the certificate of the archive, as well as additional security assessments based on other information in the certificate. In some embodiments, the process queries the rules database for matching rules that can be used to make a security assessment on the archive. This operation in some embodiments includes applying code requirements to the archive. The code requirements can include instructions to examine certificates in the archive and check if the source is trusted. The process then determines (at 2660) whether to approve the archive, and hence all the documents in the archive for opening based on the matching rules. If so, the process passes (at 2670) the document to an operation handler (such as the content opening module 2570 of FIG. 25) for opening. Otherwise the process ends.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 27 conceptually illustrates an electronic system 2700 with which some embodiments of the invention are implemented. The electronic system 2700 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2700 includes a bus 2705, processing unit(s) 2710, a graphics processing unit (GPU) 2715, a system memory 2720, a network 2725, a read-only memory 2730, a permanent storage device 2735, input devices 2740, and output devices 2745.

The bus 2705 collectively represents all system, peripheral, and chipset buses that communicatively connect the numerous internal devices of the electronic system 2700. For instance, the bus 2705 communicatively connects the processing unit(s) 2710 with the read-only memory 2730, the GPU 2715, the system memory 2720, and the permanent storage device 2735.

From these various memory units, the processing unit(s) 2710 retrieves instructions to execute and data to process in order to execute the processes of the invention. The processing unit(s) may be a single processor or a multi-core processor in different embodiments. Some instructions are passed to and executed by the GPU 2715. The GPU 2715 can offload various computations or complement the image processing provided by the processing unit(s) 2710. In some embodiments, such functionality can be provided using CoreImage's kernel shading language.

The read-only-memory (ROM) 2730 stores static data and instructions that are needed by the processing unit(s) 2710 and other modules of the electronic system. The permanent storage device 2735, on the other hand, is a read-and-write memory device. This device is a non-volatile memory unit that stores instructions and data even when the electronic system 2700 is off. Some embodiments of the invention use a mass-storage device (such as a magnetic or optical disk and its corresponding disk drive) as the permanent storage device 2735.

Other embodiments use a removable storage device (such as a floppy disk, flash memory device, etc., and its corresponding disk drive) as the permanent storage device. Like the permanent storage device 2735, the system memory 2720 is a read-and-write memory device. However, unlike storage device 2735, the system memory 2720 is a volatile read-and-write memory, such a random access memory. The system memory 2720 stores some of the instructions and data that the processor needs at runtime. In some embodiments, the invention's processes are stored in the system memory 2720, the permanent storage device 2735, and/or the read-only memory 2730. For example, the various memory units include instructions for processing multimedia clips in accordance with some embodiments. From these various memory units, the processing unit(s) 2710 retrieves instructions to execute and data to process in order to execute the processes of some embodiments.

The bus 2705 also connects to the input and output devices 2740 and 2745. The input devices 2740 enable the user to communicate information and select commands to the electronic system. The input devices 2740 include alphanumeric keyboards and pointing devices (also called "cursor control devices"), cameras (e.g., webcams), microphones or similar devices for receiving voice commands, etc. The output devices 2745 display images generated by the electronic system or otherwise output data. The output devices 2745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 27, bus 2705 also couples electronic system 2700 to a network 2725 through a network adapter (not shown). In this manner, the computer can be a part of a network of computers (such as a local area network ("LAN"), a wide area network ("WAN"), an intranet, or a network of networks, such as the Internet). Any or all components of electronic system 2700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, at least some of the figures (including FIGS. 2, 3, 13, 17, 18, and 26) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method comprising:
   providing an operating system that assesses security operations;
   within said operating system, providing a security assessor for making security assessments of operations to be performed in said operating system; and
   providing a rules database for determining outcomes of the security assessments, wherein the rules database comprises:
     an authority table for storing a first plurality of entries, each entry in the authority table is associated with a priority value and rules that implement security policies of the operating system; and
     a cache table for storing a second plurality of entries, each entry in the cache table comprising outcomes of the security assessments,
   wherein the security assessor makes the security assessments by examining the entries of the authority table according to an order based on the priority values associated with the entries of the authority table.

2. The method of claim 1, wherein each entry of the authority table comprises a code requirement that specifies a set of characteristics required of a data object in order for it to comply with the security policies of the operating system.

3. The method of claim 1, wherein a security assessment for an operation is made based on a data object needed to perform the operation.

4. The method of claim 3, wherein each entry of the cache table corresponds to a unique data object.

5. The method of claim 3, wherein each entry of the cache table stores an outcome of a previous security assessment of a data object.

6. The method of claim 3, wherein an entry of the cache table corresponding to the operation is indexed by a hash value generated based on the data object needed to perform the operation.

7. The method of claim 1, wherein each priority value of the first plurality of entries is a numerical value.

8. The method of claim 7, wherein the order in which the security assessor examines entries in the authority table is a descending order with respect to each entry's numerical value.

9. The method of claim 1, wherein each entry in the cache table is associated with the priority value of the authority table entry that is used to create the cache table entry.

10. The method of claim 9, wherein a change in an authority table entry associated with a particular priority value purges all cache table entries with priority values lower than the particular priority value.

11. An operating system comprising:
    an operation initiator for launching operations associated with applications executing in the operating system, wherein launching the operations comprises requesting security assessments for the operations;
    a security assessor for performing the requested security assessments; and
    a rules database for determining outcomes of the security assessments, wherein the rules database comprises:
      an authority table for storing a first plurality of entries, each entry in the authority table is associated with a priority value and rules that implement security policies of the operating system; and
      a cache table for storing a second plurality of entries, each entry in the cache table comprising outcomes of the security assessments, wherein the security assessor performs security assessments by examining the entries of the authority table, wherein an order in which the security assessor examines the entries is based on the priority value.

12. The operating system of claim 11, wherein each entry of the authority table comprises a code requirement that specifies a set of characteristics required of a data object in order for it to comply with the security policies of the operating system.

13. The operating system of claim 11, wherein a security assessment for an operation is made based on a data object needed to perform the operation.

14. The operating system of claim 13, wherein each entry of the cache table corresponds to a unique data object.

15. The operating system of claim 13, wherein each entry of the cache table stores an outcome of a previous security assessment of a data object.

16. The operating system of claim 13, wherein an entry of the cache table corresponding to the operation is indexed by a hash value generated based on the data object needed to perform the operation.

17. The operating system of claim 11, wherein each priority value of the first plurality of entries is a numerical value.

18. The operating system of claim 17, wherein the order in which the security assessor examines entries in the authority table is a descending order with respect to each entry's numerical value.

19. The operating system of claim 11, wherein each entry in the cache table is associated with the priority value of the authority table entry that is used to create the cache table entry.

20. The operating system of claim 19, wherein a change in an authority table entry associated with a particular priority value purges all cache table entries with priority values lower than the particular priority value.

21. A method comprising:
    receiving a command to perform a particular operation in an operating system; and
    performing a security assessment for the particular operation by querying a rules database that comprises an authority table and a cache table, wherein querying the rules database comprises:

when the cache table has a valid entry that corresponds to a data object that is needed by the particular operation, retrieving the valid entry from the cache table, and when the cache table does not have a valid entry that corresponds to the data object, searching the authority table for an entry that has a rule that matches the data object, wherein the authority table is searched based on a priority value for each entry in the authority table.

22. The method of claim 21, wherein the valid cache table entry stores an outcome of a previous security assessment based on the data object that is needed by the particular operation.

23. The method of claim 21, wherein searching the authority table comprises examining entries in the authority table with higher priority values before examining entries with lower priority values.

24. The method of claim 21, wherein said particular operation is associated with a data object, wherein the entry in the cache table is indexed by a hash value generated based on the data object.

25. The method of claim 21, wherein when the cache table does not have a valid entry that corresponds to the data object, the method further comprising creating a new cache table entry for the data object.

26. The method of claim 25, wherein the new cache table entry is associated with the priority value of the authority table entry that matches the data object.

* * * * *